United States Patent
Smith et al.

(10) Patent No.: US 11,177,685 B1
(45) Date of Patent: *Nov. 16, 2021

(54) UNIVERSAL RESERVOIR CONTROLLER

(71) Applicant: Applied Underwriters, Inc., Omaha, NE (US)

(72) Inventors: Justin N. Smith, Woodside, CA (US); Mark S. Nowotarski, Stamford, CT (US)

(73) Assignee: Applied Underwriters, Inc., Omaha, NE (US)

( * ) Notice: Subject to any disclaimer, the term of this patent is extended or adjusted under 35 U.S.C. 154(b) by 202 days.

This patent is subject to a terminal disclaimer.

(21) Appl. No.: 16/541,257

(22) Filed: Aug. 15, 2019

Related U.S. Application Data

(60) Division of application No. 16/191,551, filed on Nov. 15, 2018, now Pat. No. 10,432,014, which is a continuation-in-part of application No. 12/696,256, filed on Jan. 29, 2010, now abandoned, application No. 16/541,257, which is a division of application No. 16/191,551, filed on Nov. 15, 2018, now Pat. No. 10,432,014, which is a continuation-in-part of application No. 16/177,525, filed on Nov. 1, 2018, (Continued)

(51) Int. Cl.
| | |
|---|---|
| *H02J 9/00* | (2006.01) |
| *H02J 7/00* | (2006.01) |
| *G06Q 10/06* | (2012.01) |
| *H02J 7/04* | (2006.01) |
| *G06Q 50/06* | (2012.01) |
| *G06Q 40/00* | (2012.01) |
| *H02J 3/00* | (2006.01) |

(52) U.S. Cl.
CPC .............. *H02J 9/002* (2013.01); *G06Q 10/06* (2013.01); *G06Q 40/00* (2013.01); *G06Q 50/06* (2013.01); *H02J 7/00* (2013.01); *H02J 7/007* (2013.01); *H02J 7/0071* (2020.01); *H02J 7/04* (2013.01); *H02J 9/00* (2013.01); *H02J 3/00* (2013.01); *H02J 3/001* (2020.01); *Y02B 70/00* (2013.01); *Y04S 10/14* (2013.01)

(58) Field of Classification Search
None
See application file for complete search history.

(56) References Cited

U.S. PATENT DOCUMENTS

| | | | |
|---|---|---|---|
| 1,029,085 | A | 6/1912 | Robinson |
| 2,095,943 | A | 10/1937 | Zachs |

(Continued)

OTHER PUBLICATIONS

Andrei Iancu, USPTO Remarks by Director Iancu at the Intellectual Propery Owners Association 46th Annual Meeting dated Sep. 24, 2018.

(Continued)

*Primary Examiner* — Qing Yuan Wu
(74) *Attorney, Agent, or Firm* — Mark Nowotarski

(57) ABSTRACT

A digital controller controls contingency discharges of a utility from a reservoir to a plant during a first time period and compensatory charges from the plant back to the reservoir during a second time period. The utility can be electric power. The plant and reservoir are connected by a grid. The reservoir may be any electric power storage device. When the utility is electric power, the contingency discharges make up for the power not generated by the plant due to an accident. The compensatory charges replenish the reservoir.

12 Claims, 14 Drawing Sheets

Related U.S. Application Data now Pat. No. 10,418,846, which is a division of application No. 15/975,820, filed on May 10, 2018, now Pat. No. 10,164,462.

(60) Provisional application No. 61/148,560, filed on Jan. 30, 2009.

(56) References Cited

U.S. PATENT DOCUMENTS

| | | | |
|---|---|---|---|
| 2,397,063 | A | 3/1946 | Zandt |
| 3,289,931 | A | 12/1966 | Bennett et al. |
| 3,341,117 | A | 9/1967 | Painter |
| 3,559,881 | A | 2/1971 | Maison |
| 3,739,155 | A | 6/1973 | O'Larte |
| 4,120,451 | A | 10/1978 | Stapleton |
| 4,369,359 | A | 1/1983 | Mendoza |
| 4,538,352 | A | 9/1985 | Frith |
| 4,696,109 | A | 9/1987 | Whaley, Jr. |
| 5,590,037 | A | 12/1996 | Ryan et al. |
| 5,712,984 | A | 1/1998 | Hammond et al. |
| 5,752,236 | A | 5/1998 | Sexton et al. |
| 5,987,606 | A | 11/1999 | Cirasole et al. |
| 6,226,625 | B1 | 5/2001 | Levenstein |
| 6,604,080 | B1 | 8/2003 | Kern |
| 7,359,863 | B1 | 4/2008 | Evenshaug et al. |
| 7,516,079 | B2 | 4/2009 | Harrison et al. |
| 7,565,302 | B2 | 7/2009 | Best-Devereux |
| 7,693,731 | B1 | 4/2010 | Weber et al. |
| 7,698,213 | B2 | 4/2010 | Lancaster |
| 7,908,157 | B1 | 3/2011 | Menzies et al. |
| 9,008,807 | B2 | 4/2015 | Shapiro et al. |
| 9,262,782 | B2 | 2/2016 | Coleman et al. |
| 9,262,786 | B1 | 2/2016 | Marwaha et al. |
| 9,280,790 | B2 | 3/2016 | Duquette |
| 9,355,391 | B2 | 5/2016 | Von Behren et al. |
| 9,614,374 | B2 | 4/2017 | Patel et al. |
| 2003/0074277 | A1 | 4/2003 | Foutz |
| 2008/0027762 | A1 | 1/2008 | Herzfeld et al. |
| 2008/0052135 | A1 | 2/2008 | Ziade et al. |
| 2008/0306779 | A1 | 12/2008 | Thomas et al. |
| 2009/0012840 | A1 | 1/2009 | Gaubatz et al. |
| 2009/0192829 | A1 | 7/2009 | Long et al. |
| 2010/0010837 | A1 | 1/2010 | Lang et al. |
| 2011/0087594 | A1 | 4/2011 | Bierer et al. |
| 2011/0137788 | A1 | 6/2011 | Merkle |
| 2016/0241031 | A1 | 8/2016 | Hooshmand et al. |

OTHER PUBLICATIONS en.wikipedia.org, Nomogram, https://en.wikipedia.org/wiki/Nomogram, last viewed Oct. 19, 2018.
Robert B. Foster, Proceedings of the Casulaty Actuarial Society, vol. XLI, Nos. 75 & 76, 1954.
Crouse, Charles W., "On Non-Linear Retrospecrtive Rating", Proceedings of the Casulaty of Actuarial Society, Nov. 18, 1949 pp. 35-62.
Lee, Yoong-Sin, "The Mathematics of Excess of Loss Coverages And Retrospective Rating—A Graphical Approach", Proceedings of the Casualty of Actuarial Sociiet, Nov. 1988 pp. 49-77.
13.N.M. Valerius, Risk Distributions Underlying Insurance Charges in the Retrospective Rating Plan, P.C.A.S. vol. XXIX, No. 59 (1942) pp. 96-121.
Brosium, J. Eric; Table M Construction, 2002, last viewed Jun. 1, 2017.
Dorweiler, Paul; On Graduating Excess Pure Premium Ratios, P.C.A.S. vol. XXVIII, No. 57 (1941) pp. 132-157; last viewed Oct. 19, 2017.
Glen, Stephanie; Dec. 9, 2014, Statistics How to, Endogenous Variable and Exogenous Variable: Definition and Classifying; http://www.statisticshowto.com/endogenous-variable/; last viewed Nov. 30, 2017.
IRMI; exposure—Insurance Glossary, last viewed Nov. 30, 2017.
Hooshmand, Ali et al.; 2014 American Control Conference Jun. 4-6, 2014; Efficiency-Driven Control of Dispatchable Sources and Storage Units in Hybrid Energy Systems; last viewed Oct. 20, 2017.
Hooshmand, Ali et al.; 2015 IEEE PES Innovative Smart Grid Technologies Latin America, A Power Management System for Planned & Unplanned Grid Electricty Outages; last viewed Oct. 20, 2017.
Kusiak, Andrew et al.; IEEE Transactions on Sustainable Energy, vol. 4, No. 1, Jan. 2013; Monitoring Wind Farms With Performance Curves; last viewed Dec. 21, 2017.
Statistics & Control, Inc.; 2017; Optimizing the Smart Grid and Digital Power Plants with OptiRamp®; last viewed Oct. 11, 2017.
Perryman, F.S.; Possible Values for Retrospective Rating Plans, P.C.A.S. vol. XXXI, No. 61 (1944) pp. 5-34; last viewed Oct. 19, 2017.
Valerius, Nels M.; 13. N.M. Valerius, Risk Distributions Underlying Insurance Charges in the Retrospective Rating Plans, P.C.A.S. vol. XXIX, No. 59 (1942) pp. 94-121, last viewed Oct. 18, 2017.
en.wikipedia.org, Goal seeking, https://en.wikipedia.org/wiki/Goal_seeking, last viewed Dec. 6, 2017.
en.wikipedia.org, Insurability, https://en.wikipedia.org/w/index.php?title=Insurability&oldid=810304549, last viewed Nov. 29, 2017.
en.wikipedia.org, Transfer function, https://en.wikipedia.org/wiki/Transfer_function, last viewed Oct. 11, 2017.
Brosius, Eric, J. "Table M Construction", Casualty Actuarial Society (study note) 2002.
Cai, Jyn, Tan, Ken Seng, Weng, Changguo, and Zhang, Yi, "Optimal Reinsurance Under VaR and CTE Risk Measures", Article, Insurance:Mathematic and Economics, Elsevier B.V. Mar. 2007.
Carlson, Thomas, O. "An Actuarial Analysis of Retrospective Rating", Proceedigs of the Casualty Actuarial Society vol. XXVIII, Nov. 14, 1941.
Gillam, W.R.; and Snader, R.H., "Fundamentals of Individual Risk Rating," National Council on Compensation Insurance (Study Note), 1992, Part I. Revised Oct. 1, 2002.
Gillam, W.R.; and Snader, R.H., "Fundamentals of Individual Risk Rating," National Council on Compensation Insurance (Study Note), 1992, Part II.
Gillam, W.R.; and Snader, R.H., "Fundamentals of Individual Risk Rating," National Council on Compensation Insurance (Study Note), 1992Part III.
Hewitt, C.C. Jr, 'Loss Ratio Distribution , A Model', Proceedigs of the Casualty Actuarial Society vol. LIV , 1967, Year Book 1968.
"Large Risk Alternative Rating Opiton", Filing Memorandum, The Workers' Compensation Rating and Inspection Bureau of Massachusetts, Jan. 7, 1993.
"Retrospective Rating Plan", Web page, The Workers' Compensation Rating and Inspection Bureau of Massachusetts, Jun. 30, 2009.
Mahler, Howard, C., "The Interaction of Maximum Premiums, Minimum Premiums and Accident Limits in Retrospective Rating", Proceedings of the Casualty Actuarial Society vol. LXIII. 1976.
"CompVision System, rating plans", P&C Insurance Systems, Inc. Mar. 15, 2005.
Perryman, F.S. "Written Disccusion on Non-Linear Retrospective Rating, Charles W. Crouse" Proceedigs of the Casualty Actuarial Society, Nov. 17, 1950.
Perryman, F.S. "Possible Values for Retrospective Rating Plans", Proceedings of the Casualty Actuarial Society vol. XXXI, Nov. 1, 1944.
"Retrospective Rating Plan Manual, State special Rules", Manual, Massachusetts, Apr. 1, 1995 , copyright material of the National Council on compensation Insurance 1994.
Simon, Leroy, J. "The 1965 Table M", Proceeedings, of the Casualty Actuarial Society May 1965 vol. LII part I.
Teng, Michael and Perkins, Miriam, "Estimating the Premium Asset on Retrospectively Rated Policies", Apr. 8, 2004.
Vandewalle, B. & Beirlant, J. "On Univariate Extreme Value Statistics and the Estimation of Reinsurance Premiums" Article, Insurance:Mathematic and Economics, Elsevier B.V. Jul. 2005.

UNIVERSAL RESERVOIR CONTROLLER

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE INVENTION

Embodiments of the present invention relate to controllers for reservoirs.

BACKGROUND OF THE INVENTION

Utility grids, such as electrical power grids, might have one or more plants that produce said utility for distribution by the grids. Said plants, however, may be subject to random adverse events that affect their ability to produce a demanded amount of said utility. Some utility grids have reservoirs for storing said utility for distribution to the plants to make up for the adverse events. These distributions of a utility from a reservoir to a plant due to random adverse events are referred to herein as "contingency discharges". The contingency discharges from a reservoir to one of the plants might be due to random adverse events occurring during a first time period. In order to make up for the contingency discharges that are due to random adverse events occurring during a first time period, the plants connected to the reservoir by the grid may be required to make compensatory charges to the reservoir during a subsequent second time period. A technical problem to be solved, therefore, is controlling the compensatory charges from the plants to the reservoir during the second time period so that, in aggregate, they make up for the contingency discharges that are due to random adverse events that occur during the first time period.

It is not enough, however, to say that the individual plants should make compensatory charges to the reservoir equal to the contingency discharges they each individually received from the reservoir. The contingency discharges may be rare and when they do occur, they may be quite large. This is referred to herein as a "long tail distribution" of contingency discharges. Thus, it might exceed a plant's ability to provide compensatory charges during a second time period when a rare large contingency discharge occurs due to a random adverse event that occurs during a first time period. Thus, a further technical problem to be solved is how to control the compensatory charges from all of the plants connected to the reservoir by the grid so that, in aggregate, they make up for a distribution of contingency discharges that has a long tail.

SUMMARY OF THE INVENTION

The summary of the invention is provided as a guide to understanding the invention. It does not necessarily describe the most generic embodiment of the invention or the broadest range of alternative embodiments.

FIG. 1 is a schematic of a utility grid system 100. The system comprises a utility grid 102 for transmitting a utility from one or more plants 104, 106, 108, 112, 114, 116, and 118 to consumers of said utility (not shown) and a reservoir of said utility 184. As used herein, a "utility" is any commodity that can be transmitted and stored. Utilities can include electric power, water, computer processor time, computer memory, food commodities (e.g. grain) and monetary funds (e.g. fiat currencies, private currencies, and/or block chain currencies). Transmission can be by physical transfer, such as water flow through a pipe. Transmission can also be by virtual allocation such as transferring assignment of a given computer memory capacity in a reservoir of computer memory (e.g. a distributed computing system) to a particular plant. Transfer of financial instruments, such as commodity futures, can be considered a type of virtual allocation of said commodity. A reservoir may physically store a utility, such as a battery storing electric power. A reservoir may also virtually store a utility, such as by depositing monetary funds in a monetary reserve where they can be used to purchase the utility as needed. The reservoir may be subject to leakage of the utility, such as when a battery has internal leakage currents that dissipate its stored electric power. The grid may have losses, such as power loss in transmission. Thus, the compensatory charges may have a certain minimum requirement to make up for said leakage and losses.

The grid 102 may comprise a digital controller 182. The digital controller controls contingency discharges (e.g. item 174) of the utility from the reservoir to at least one of the plants (e.g. item 104) due to random adverse events occurring during a first time period. The contingency discharges of said utility from said reservoir to said plant are in response to random adverse events that either increase the demand of said utility from said plant, reduce the capacity of said plant to produce said utility, or combinations of both. The random adverse events may include any event that can be described by a probability distribution and is not in direct control of the plant. Examples include any insurable risk, such as one or more of:
  i) a loss of electric power capacity due to wind damage to said plant;
  ii) an increase in water demand from said plant due to drought; or
  iii) a loss of labor due to an on-the-job injury of one of the employees in said plant.

The contingency discharges from said reservoir to said plant may be one or more of:
  i) sufficient electric power to make up for said lost electric power capacity;
  ii) sufficient water to make up for said increase in water demand; or
  iii) sufficient monetary funds to make up for the medical costs and lost time costs of said injured employee.

The digital controller also or alternatively controls compensatory charges (e.g. item 172) of said utility from said plant to said reservoir during a second time period. The compensatory charges will be controlled as a function of the contingency discharges. This will be described in more detail below.

The digital controller may comprise:
  i) an input device 171 for receiving input from a user;
  ii) an output device such as a screen 173 for presenting output to said user;
  iii) a sensor 175 (shown as an arrowhead) for receiving data about said contingency discharges from said reservoir to said plant;
  iv) an output device 177 (shown as an arrow head) for controlling said compensatory charges from said plant to said reservoir;
  v) a processor (e.g. a microprocessor) for processing data; and vi) a permanent memory comprising computer readable instructions to cause said processor to physically carry out the steps required to control the compensatory charges as a function of the contingency discharges.

The sensor 175 may comprise a physical sensor, such as an electric power meter or a water meter. It may also or alternatively comprise a device for receiving data from a human. This may include one or more of:
a) an optical scanner;
b) a keyboard;
c) a touch screen; or
d) a voice recognition system.

For example, a human might read an electric meter and input the result into the controller using a keyboard or a touch screen. Similarly, a human might receive a written report of the costs of medical treatment for an injured worker and input the costs into the controller using an optical scanner with optical character recognition.

The output device 177 may comprise a physical device, such as a switch for controlling the flow of electric power, a valve for controlling water flow, or a monetary transfer system for automated funds transfer. It may also or alternatively comprise a device for communicating with a human. The device for communicating with a human may comprise one or more of:
a) a screen;
b) a printer; or
c) a synthesized voice.

For example, the controller may call a plant operator on the plant operator's cell phone and instruct the operator to transfer a compensatory charge of electrical energy from the plant to the reservoir (e.g. a battery). Similarly, the controller may provide output on a screen or a printer instructing a plant operator to transfer monetary funds to a monetary reserve (e.g. a paper invoice instructing a plant operator to pay a retrospective insurance premium (i.e. a compensatory charge)).

FIGS. 5A to 5C show a flow chart of the steps required to control the compensatory charges as a function of the contingency discharges. These steps are:
(1) read in 502 from said user, exogenous data describing an exposure of said plant wherein said exposure of said plant is an estimate of the expected total contingency discharges from a reservoir to said plant due to random adverse events occurring during a standard time period;
(2) determine 504 an exposure size class of said plant using said exogenous data wherein said exposure size class spans a range of exposures;
(3) read in 506 from a distribution database, a normalized distribution of normalized contingency discharges from one or more reference reservoirs to a plurality of reference plants due to random adverse events occurring during said standard time period, wherein:
(a) said reference plants are connected to said reference reservoirs by one or more reference grids;
(b) said reference plants are all in said exposure size class of said plant; and
(c) said normalized contingency discharges from said one or more reference reservoirs to said reference plants are equal to measured reference contingency discharges from said one or more reference reservoirs to each of said reference plants divided by the exposure of each of said reference plants;
(4) select 508 a base function describing a relationship between normalized compensatory charges from said plant to said reservoir over a second time period, versus normalized contingency discharges from said reservoir to said plant due to random adverse events occurring during said first time period wherein:
(a) said normalized compensatory charges are equal to compensatory charges from said plant to said reservoir over said second time period divided by said exposure of said plant;
(b) said normalized contingency discharges are equal to contingency discharges from said reservoir to said plant due to random adverse events occurring during said first time period divided by said exposure of said plant;
(c) said first time period has the same duration as said standard time period;
(d) said second time period has the same duration as said standard time period; and
(e) said second time period occurs after said first time period;
(5) select 510 a trim function describing a relationship between said normalized compensatory charges from said plant to said reservoir over said second time period, versus said normalized contingency discharges from said reservoir to said plant due to random adverse events occurring during said first time period;
(6) determine 512 a transfer function equal to said base function plus a scaled trim function wherein said scaled trim function is equal to said trim function times a trim multiplier;
(7) balance 514 said transfer function by selecting said trim multiplier such that the integral of the product of said transfer function and said normalized distribution of normalized contingency discharges is about 1 when said integral is performed over a range of normalized contingency discharges that might be experienced by said plant due to random adverse events occurring during said first time period;
(8) display 516 on a screen to said user, said balanced transfer function as either a graph or a table of required compensatory charges from said plant to said reservoir over said second time period, versus measured contingency discharges from said reservoir to said plant due to random adverse events occurring during said first time period;
(9) accept 518 from said user, input to modify said transfer function by modifying either said base function or said trim function;
(10) balance 520 said modified transfer function by adjusting said trim multiplier;
(11) display 522 on said screen said balanced modified transfer function;
(12) accept 524 from said user, input on whether or not said user is done modifying said transfer function;
(13) when said user is not done 521 modifying said transfer function, re-execute said steps of:
(a) accept 518 from said user, input to modify said transfer function by modifying either said base function or said trim function;
(b) balance 520 said modified transfer function by adjusting said trim multiplier;
(c) display 522 on said screen said balanced modified transfer function; and
(d) accept 524 from said user, input on whether or not said user is done modifying said transfer function;
(14) when said user is done 523 modifying said transfer function, receive 526 via a sensor a measured quantity of contingency discharges from said reservoir to said plant due to random adverse events occurring during said first time period;

(15) determine 528 using said transfer function, a quantity of required compensatory charges from said plant to said reservoir during said second time period; and

(16) instruct 530 said plant to provide said quantity of required compensatory charges from said plant to said reservoir during said second time period.

DETAILED DESCRIPTION

The detailed description describes non-limiting exemplary embodiments. Any individual features may be combined with other features as required by different applications for at least the benefits described herein.

As used herein, the term "about" means plus or minus 10% of a given value unless specifically indicated otherwise.

As used herein, a computer-based system, such as a digital controller, comprises an input device for receiving data, an output device for outputting data in tangible form (e.g. printing on paper or displaying on a computer screen), a permanent memory for storing data as well as computer code, and a processor (e.g. a microprocessor) for executing computer code wherein said computer code resident in said permanent memory will physically cause said processor to read-in data via said input device, process said data within said processor and output said processed data via said output device.

As used herein, the term "shaped" means that an item has the overall appearance of a given shape even if there are minor variations from the pure form of said given shape.

As used herein, the term "generally" when referring to a shape means that an ordinary observer will perceive that an object has said shape even if there are minor variations from said shape.

As used herein, relative orientation terms, such as "up", "down", "top", "bottom", "left", "right", "vertical", "horizontal", "distal" and "proximal" are defined with respect to an initial presentation of an object and will continue to refer to the same portion of an object even if the object is subsequently presented with an alternative orientation, unless otherwise noted.

Figure 1:
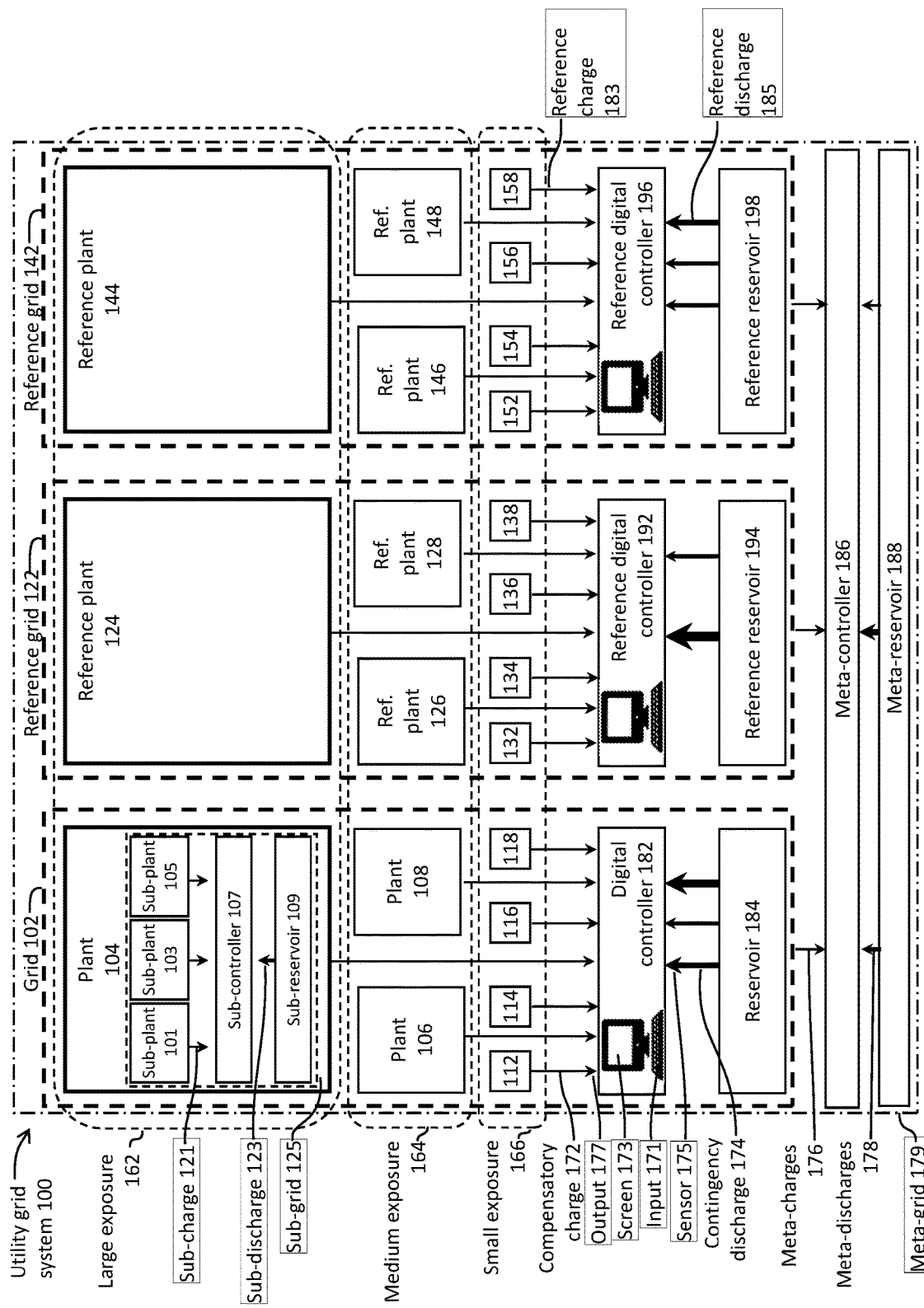
FIG. 1 is a schematic of a utility grid system.

Reference Grids for Determining a Normalized Distribution of Normalized Contingency Discharges Referring to FIG. 1, the utility grid system 100 may comprise one or more reference grids 122, 142. These are used to determine a normalized distribution of normalized contingency discharges of a utility from a reservoir to a plant in a given exposure size class due to random adverse events occurring during a standard time period. Each reference grid may connect one or more reference plants 124, 126, 128, 132, 134, 136, 138, 144, 146, 148, 152, 154, 156, and 158 to corresponding reference reservoirs 194, 198. Reference contingency discharges (e.g. item 185) from the reference reservoirs to the reference plants due to random adverse events occurring during a first time period may be controlled by one or more reference digital controllers 192, 196. Reference compensatory charges (e.g. item 183) from the reference plants to the reference reservoirs during a second time period may also or alternatively be controlled by the one or more reference digital controllers. The first and second time periods may have durations that are the same as the standard time period.

The different reference plants may have different exposures to random adverse events that would impact their ability to provide a utility to a grid at a required demand. For example, a solar electric power array might have an exposure to wind damage. The level of exposure might be a function of the solar panel design, its geographic location, how well maintained the array is and the total area of solar panels. These are all exogenous variables. The exogenous variables can be used to develop a model of the expected average contingency discharges that might be required due to random adverse events occurring during a standard time period. The model can be built by measuring contingency discharges from a plurality of solar arrays over a plurality of standard time periods to develop a correlation between the exogenous variables and the expected average quantity of contingency discharges due to random adverse events occurring over said standard time periods. The expected average quantity of contingency discharges due to random adverse events occurring during a standard time period is referred to herein as the "exposure" of the plant. This is analogous to the term "exposure" as it is used in the insurance industry to indicate the expected average total value of the claims (i.e. the contingency discharges) of an insured (i.e. the plant) against an insurer's reserves (i.e. the reservoir) due to random adverse events occurring during the term of the insured's insurance coverage (i.e. the standard time period). The compensatory charges are analogous to insurance premiums. The digital controller is analogous to the insured's computer systems which execute the insured's functions (e.g. payment of claims and printing of premium invoices).

Once the different exposures of the reference plants are determined, the reference plants may be categorized into different exposure size classes. The exposure size classes each span a range of exposures. The sizes of the rectangles representing the plants and reference plants shown in FIG. 1 indicate the exposure sizes of the respective plants. FIG. 1 shows that both the plants and the reference plants have been categorized into three size classes. The size classes are large exposure 162, medium exposure 164 and small exposure 166.

Any number of exposure size classes may be used. The size ranges for each exposure size class should be large enough so that there are enough reference plants in a size class to get an adequate distribution. A suitable minimum number of reference plants in a given size class might be 100. To build the distribution, the quantities of reference contingency discharges for the reference plants are divided by the exposure of each reference plant to give normalized contingency discharges. These normalized contingency discharges are sorted based on value (e.g. low to high) to give a cumulative distribution function (CDF). This is also referred to herein as a normalized contingency discharge rank. The cumulative distribution function, in turn, can be used to calculate a normalized distribution of normalized contingency discharges for the given exposure size class. The normalized distribution of normalized contingency discharges may be stored in a digital permanent memory as a set of equally spaced points with a discharge increment between each point. As will be discussed below, this storage format provides improvements in computer functionality when calculating compensatory charges. The contingency discharges for the plants in the grid 102 can also be contributed to the data from the reference plants to build the normalized distribution of normalized contingency discharges. An exemplary normalized distribution of discharges is shown at item 206 in FIG. 2. This will be discussed in more detail below.

Meta-Controllers and Sub-Controllers

Referring again to FIG. 1, the grid 102 and reference grids 122, 142 may be connected by a larger meta-grid 179 to a meta-reservoir 188. A meta-controller 186 may control meta-discharges 178 of said utility from said meta-reservoir to said reservoirs due to random adverse events occurring to said grids during a first time period. The meta-controller may also or alternatively control meta-charges 176 from the reservoirs to the meta-reservoir during a second time period. This is analogous to reinsurance where the meta-controller corresponds to the computer systems of a reinsurer, the meta-reservoir corresponds to a reinsurer's monetary reserves, the meta-discharges correspond to reinsurance claims and the meta-charges correspond to reinsurance premiums.

A plant 104 may have its own internal sub-plants 101, 103, and 105. A wind farm, for example, may have a plurality of individual wind mill generators. Each wind mill generator would be considered a sub-plant. The sub-plants may be connected to a sub-reservoir 109 by a sub-grid 125. A sub-reservoir, for example, might be a battery backup connected to the plurality of individual wind generators. A sub-controller 107 may control sub-discharges 123 of the utility from the sub-reservoir to the individual sub-plants due to random adverse events affecting said individual sub-plants during a first time period. The sub-controller may also or alternatively control sub-charges 121 from all of the sub-plants to the sub-reservoir during a second time period. This is analogous to self-insurance.

Multiple meta-grids may be connected by a meta-meta-grid to a meta-meta-reservoir. Similarly, a sub-plant may comprise sub-sub-plants which are connected by sub-sub-grids to a sub-sub-reservoir. Thus, the control systems described herein may be applied recursively at any meta level or sub level of plants, grids and reservoirs.

Different meta levels and sub levels may be for different utilities. At a first level, for example, the utility may be electricity. At a meta level to said first level, the utility may be monetary funds. In the wind farm example, the first level may comprise an electrical power reservoir (e.g. a battery) connected by an electrical grid to a plurality of wind mill generators (i.e. the plants). If an individual wind mill generator suffers a random adverse event, such as wind damage, a controller can determine the required compensatory charges for said wind mill generator for a second time period. The meta level may comprise a plurality of wind farms that are connected by a monetary grid to an insurance reserve fund (i.e. the reservoir) through an insurance policy. If an entire wind farm shuts down due to a large-scale event (i.e. a hurricane), the insurance policy will provide funds (i.e. the contingency discharges) to purchase electricity on behalf of the downed wind farm. The insurance company (i.e. the controller) may then determine a retrospective premium (i.e. the compensatory charge) to be required from the downed wind farm during a second time period. The retrospective premium may comprise a basic charge to cover administrative costs and profits (i.e. the losses).

There may be interactions between meta levels and sub levels. For example, if a wind farm has an energy storage reservoir connected to a plurality of wind mill generators, it may be less likely to suffer a complete shut down in the event of a large scale random adverse event. Hence its insurance premiums may be lower.

Controller Transfer Function

One of the technical challenges in implementing a reservoir controller as described herein is determining an appropriate transfer function for the controller that relates the normalized contingency discharges from a reservoir to a plant due to random adverse events occurring during a first time period to the required normalized compensatory charges from said plant back to said reservoir during a second time period. There are three practical considerations that should be met by the transfer function. These considerations are:

1. The combined compensatory charges from all of the plants to the reservoir is set equal to or greater than the combined exposures of the plants: One of the practical considerations to be met by the transfer function is that the combined compensatory charges for all of the plants to the reservoir during a second time period should, on average, make up for all of the contingency discharges due to random adverse events occurring during a first time period. This requirement can be met if the combined compensatory charges are set equal to or greater than the combined exposures of all of the plants. This will normally be adequate as long as the contingency discharges for the different plants in a grid are independent of each other and as long as there are a large number of plants (e.g. 100 or more). There are situations, however, where the contingency discharges are correlated with each other and not independent. This can occur, for example, when all of the plants are in a given geographic area and that geographic area suffers a common adverse event, such as a hurricane. The potential correlation of contingency discharges gives rise to the need for meta-grids and meta-reservoirs. Nonetheless, there is substantial utility to the controller if this first consideration is met even without meta-reservoirs or meta-controllers.
2. The compensatory charges required from each plant are capped: Another practical condition to be met is that the total compensatory charges from a plant to a reservoir during a second time period is capped to a practical maximum value. This helps make sure that any single plant's required compensatory charges will not exceed said plant's realistic ability to provide said compensatory charges. Otherwise said plant might not have enough physical capacity to meet both the demands of its customers and provide the compensatory charges to the reservoir required by the controller.

3. The transfer function always increases or stays the same: Another practical consideration to be met is that the compensatory charges determined by the transfer function always increases or stay the same with increasing contingency discharges. A plant's expected contingency discharges may be affected to a certain extent by factors under the control of the plant. If the required compensatory charges during a second time period increases with increasing contingency discharges due to random adverse events occurring during a first time period, then the employees and management of the plant will be motivated to take actions that reduce the plant's susceptibility to adverse events. These actions might include better safety equipment for plant employees so that they are less likely to suffer injuries. If, on the other hand, the transfer function decreases with increasing contingency discharges, then the employees or management could theoretically be motivated to take actions or delay actions that result in the plant experiencing more contingency discharges. For example, maintenance might be delayed which would make the plant more vulnerable to breakdowns. Features in the transfer function that motivate actions or inactions that lead to more contingency discharges are termed "moral hazards" and should be avoided. This is similar to the concept of moral hazard in insurance.

Exemplary Transfer Functions

Figure 2:
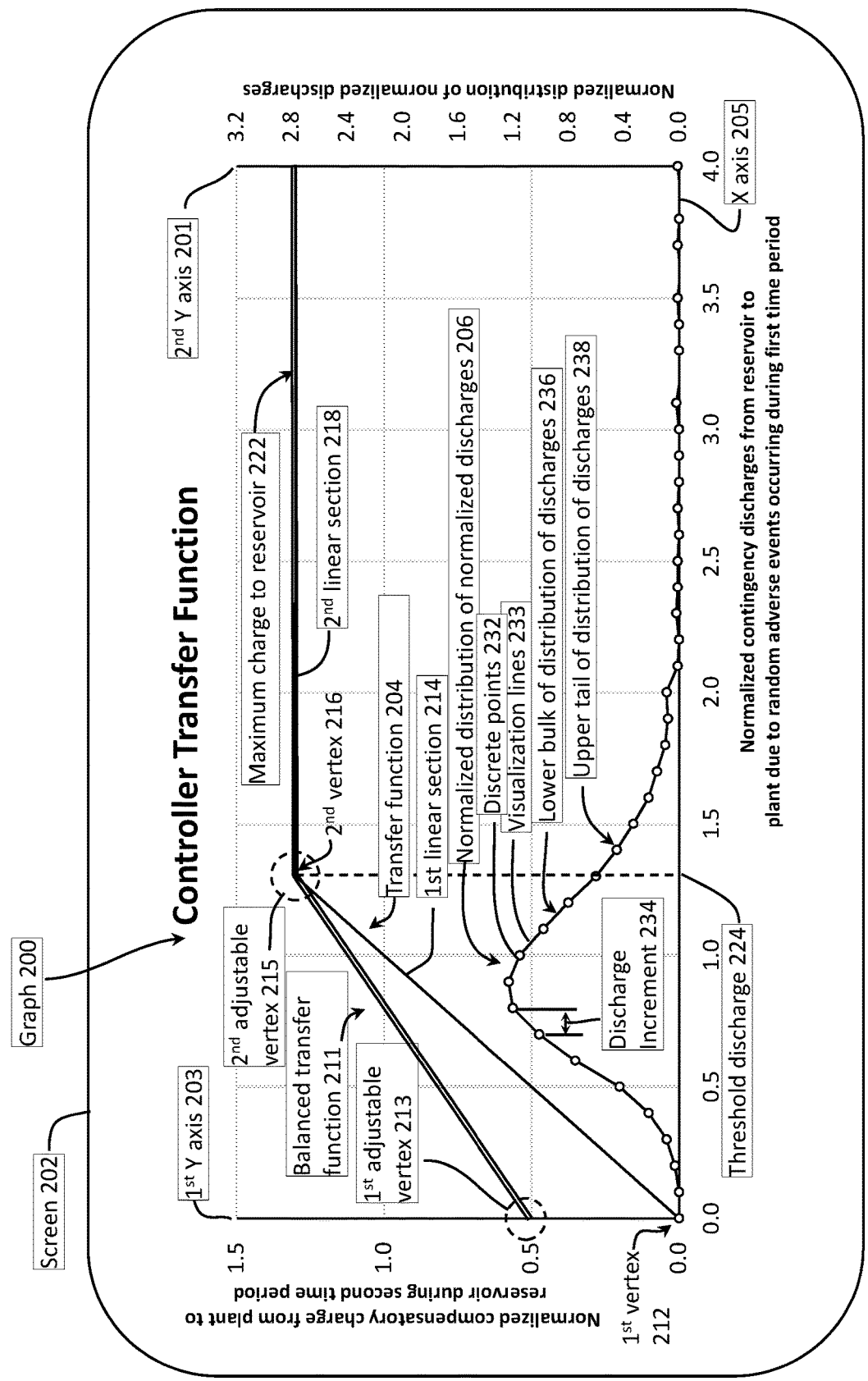
FIG. 2 is a graph of a controller transfer function output on a screen.

FIG. 2 is a graph 200 of a controller transfer function 204 displayed on a screen 202 to a user. The graph shows the transfer function as a relationship between normalized compensatory charges from a plant to a reservoir during a second time period (1$^{st}$ Y axis 203), versus normalized contingency discharges from said reservoir to said plant due to random adverse events occurring during a first time period (X axis 205). FIG. 2 also shows a graph 206 of a normalized distribution of normalized discharges for plants in a given size class. The Y values of said graph of said distribution are shown on the 2$^{nd}$ Y axis 201.

The transfer function 204 comprises:
a) a first vertex 212 followed by a first linear section 214 with a first positive slope; and
b) a second vertex 216 followed by a second linear section 218 with about a zero slope wherein said second vertex connects said first linear section to said second linear section.

In this example, the first vertex is at the origin and the first slope is equal to 1. The second vertex has an X value equal to a threshold discharge 224. The threshold discharge in this example is about 1.3. Since the slope of the first linear section is 1, the maximum normalized compensatory charge to the reservoir 222 is about 1.3 as well. Thus, this transfer function meets practical considerations #2 (capped compensatory charge) and #3 (always increases or stays the same). This transfer function will not, however, meet practical consideration #1 (compensatory charges equal to the combined exposures of the plants). The reason that practical consideration #1 is not met is due to the combined features of:
1. the first vertex is at the origin;
2. the slope of the first linear section is 1; and
3. the transfer function 204 is capped.

Plants with normalized contingency discharges below the threshold discharge will only provide enough compensatory charges to make up for their individual contingency discharges. There will be no excess compensatory charges available to make up for the plants whose normalized contingency discharges are above the threshold discharge. These plants will have required compensatory charges that are less than their contingency discharges. In this situation, the reservoir will gradually drain over consecutive time periods. In order to meet practical consideration #1, therefore, the transfer function must be modified to collect additional normalized compensatory charges from the plants that have normalized contingency discharges below the threshold discharge.

Balanced Transfer Function

One method to modify the transfer function so that practical consideration #1 is met, is to create a modified transfer function for each exposure size class so that each exposure size class by itself meets practical consideration #1. If each exposure size class by itself meets practical consideration #1, then all exposure size classes collectively will meet practical consideration #1. Alternatively, the transfer function may be made dependent on the exposure size class such that some exposure size classes subsidize other exposure size classes. This too would also meet practical consideration #1, but may introduce a certain amount of moral hazard if the subsidies are so great that the subsidized exposure size classes no longer take action to minimize their exposure to random adverse events.

Each exposure size class can meet practical consideration #1 if equation 1 below is satisfied.

$$\int_{x_{min}}^{x_{max}} T_m(x, p) PDF_m(x) dx \cong 1 \tag{1}$$

where:
x is a quantity of normalized contingency discharges for random adverse events occurring during a first time period;
$x_{min}$ is a minimum x in a range of x;
$x_{max}$ is a maximum x in said range of x;
p is a set of one or more parameters of the transfer function $T_m(x,p)$;
$T_m(x,p)$ is the transfer function for a given exposure size class m as a function of x and p; and
$PDF_m(x)$ is the normalized distribution of normalized discharges for plants in a given exposure size class m. The distribution is normalized over x.

For each exposure size class m, the parameters p of the transfer function can be adjusted subject to the condition that the integral of equation 1 is equal to about 1. A transfer function that meets this criterion is referred to herein as being "balanced". This process may be repeated for all exposure size classes of the plants in a given grid. In this manner, practical consideration #1 will be met for the grid as a whole.

$x_{min}$ and $x_{max}$ are selected to capture all expected values of the normalized contingency discharges for the plants in each exposure size class. For example, $x_{min}$ may be set to 0 and $x_{max}$ may be set to 10. In effect, this says that the probability of any quantity of contingency discharges exceeding the average quantity of contingency discharges for all of the plants in a given size class by more than a factor of 10 is so small that it can be ignored. This is an important consideration when the $PDF_m(x)$ is built on a finite number of observed values such that a stray but very large observed value incorporated into the $PDF_m(x)$ could shift the integral of equation 1 to a higher value than it should be.

Equation 1 can be expressed verbally as:

A transfer function is balanced when the integral (e.g. fdx) of the product of said transfer function (e.g. $T_m(x,p)$) and the normalized distribution of normalized contingency discharges (e.g. $PDF_m(x)$) is about 1 when said integral is performed over a range (e.g. $x_{min}$ to $x_{max}$) of normalized contingency discharges that might be experienced by said plant during a first time period.

The transfer function 204 could be balanced by adjusting the parameters of the first vertex 212 and/or the slope of the first linear section 214. If the Y value of the first vertex were increased, for example, the normalized compensatory charges collected from plants with normalized contingency discharges below the threshold discharge would increase. This would make up for the missing compensatory charges from the plants with normalized contingency discharges above the threshold discharge. A balanced transfer function 211 is shown where the Y value of the 1$^{st}$ vertex was used as a parameter p in equation 1 and adjusted until the integral had a value of about 1.

Developing a $PDF_m(x)$ for Each Exposure Size Class m

The missing normalized compensatory charges from plants with normalized contingency discharges above the threshold discharge is defined herein as the "missing normalized compensatory charges" or MNC. Sets of $(x_i, MNC_i)$ for reference plants in given size class m can be generated by the steps of:

collect normalized reference contingency discharge data, $r_j$, from a set of n reference plants in exposure size class m;

define a set of discrete, equally spaced values of normalized contingency discharges, $x_i$, with a discharge increment $\Delta x$ between each adjacent $x_i$;

sum the values of $(r_j - x_i)$ when $r_j \geq x_i$;

divide the sum by n to get an $MNC_i$ for each $x_i$; and store the set of $(x_i, MNC_i)$ values in a permanent memory for later retrieval and use by the digital controller.

These steps can be expressed as equation 2 below.

$$MNC_i = \frac{\sum_{j=1}^{n} \text{if } ((r_j \geq x_i), (r_j - x_i), 0)}{n} \quad (2)$$

where:

$r_j$ is the sum of normalized contingency reference discharges (e. g. item 185 FIG. 1) of reference plant j over a first time period;

n is the number of reference plants in said exposure size class m;

$x_i$ is the i$^{th}$ member of said set of equally spaced values of normalized contingency discharges;

$MNC_i$ is the missing normalized compensatory charge for $x_i$; and

"if(a,b,c)" means if a is true then b else c.

In the field of retrospective rating for workers' compensation insurance, $MNC_i$ corresponds to an "insurance charge" in a "Table M" compiled by the National Council on Compensation Insurers. $x_i$ corresponds to an "entry ratio" in said Table M. An exposure size class m corresponds to an "expected ultimate loss group" or EULG in said Table M. Methods of constructing Table M are described in more detail in the study note Brosius, Eric J, "Table M Construction", Casualty Actuarial Society (study note), 2002. Said study note is incorporated herein by reference with specific reference to the computational methods of constructing Table M recited therein. Said computational methods may be applied to the practical technical problem herein of constructing sets of $(x_i, MNC_i)$ from data sets of $r_j$ collected from sets of reference plants in a given exposure size class m.

One of the practical advantages of constructing a set of $(x_i, MNC_i)$ values is that it is computationally efficient for said controller to calculate a set of $(x_i, PDF_i)$ from said set of $(x_i, MNC_i)$. Equation 3 below can be used for said computationally efficient calculation.

$$PDF_i = \frac{(MNC_{i+1} - 2MNC_i + MNC_{i-1})}{\Delta x^2} \quad (3)$$

where:

i is an index number;

$MNC_i$ is the value of MNC associated with $x_i$.

$\Delta x$ is the spacing between adjacent $x_i$;

$x_i$ is the i$^{th}$ value of x; and $PDF_i$ is the i$^{th}$ value of the normalized distribution of normalized discharges.

The normalized distribution of normalized discharges 206 shown in FIG. 2 was constructed using Table M values as a model. $\Delta x$ was set to 0.1. $\Delta x$ is labeled in FIG. 2 as the "discharge increment" 234. Each value of $(x_i, PDF_i)$ is shown as a circle (e.g. item 232). The lines (e.g. item 233) connecting the circles are shown simply to help the user visualize the distribution. Only the circle values are used in computation. Hence the computation is efficient since values along the connecting lines do not have to be calculated.

The lower bulk 236 of the distribution of discharges is shown below the threshold discharge 224. The upper tail 238 of the distribution of discharges is shown above the threshold discharge.

Computationally Efficient Balancing of the Transfer Function

An improvement in performance of the digital controller for solving equation 1 can be achieved by using the data set of $(x_i, PDF_i)$ constructed from the data set of measured $(x_i, MNC_i)$. The integral for balancing the transfer function (equation 1) can be computed efficiently by finding the values of the parameter(s) p that satisfy the summation operation in equation 4 below.

$$\sum_{i=a}^{b} T_m(x_i, p) PDF_{(m,i)} \Delta x \cong 1 \quad (4)$$

where:

i is an index number;

a is the index number corresponding to the first $x_i$ in the range of x the sum is being performed over;

b is the index number corresponding to the last $x_i$ in the range of x the sum is being performed over;

$x_i$ is the i$^{th}$ value of the normalized contingency discharge x;

$\Delta x$ is the spacing between adjacent $x_i$;

p is the set of parameters for adjusting $T_m(x_i,p)$;

$T_m(x_i,p)$ is $i^{th}$ value of the transfer function for the $m^{th}$ exposure size class of the reference plants;

$PDF_{(m,i)}$ is $i^{th}$ value of the PDF for the $m^{th}$ exposure size class of the reference plants; and m is the exposure size class of a plant for whom the transfer function will be used by the digital controller for controlling compensatory charges from a plant to a reservoir during a second time period.

Thus, as used herein, the term "integral" when used in the mathematical sense means "sum" when said integral is calculated by a digital computer from a set of data for $x_i$. Similarly, dx corresponds to $\Delta x$ under the same conditions. Thus, when executed on a digital controller, equation 4 can also be expressed verbally in the same manner as equation 1. This expression is:

A transfer function is balanced when the integral (e.g. $\Sigma \Delta x$) of the product of said transfer function (e.g. $T_m(x_i, p)$) and the normalized distribution of normalized contingency discharges (e.g. $PDF_{(m,i)}$) is about 1 when said integral is performed over a range (e.g. i=a to b) of normalized contingency discharges that might be experienced by said plant during said first time period.

The process for digitally calculating the integral of equation 1 can be expressed verbally as:

The integral is calculated by summing all values of the products of:

a) said balanced transfer function for each of said $x_i$;

b) said normalized distribution of normalized discharges for each of said $x_i$; and c) said discharge increment $\Delta x$.

Digitally Determining Transfer Function Parameter Values

FIG. 2 shows the transfer function 211 after it has been balanced by adjusting transfer function parameter values. The $1^{st}$ vertex has moved up on the $1^{st}$ Y axis so that the normalized compensatory charges exceed the normalized contingency discharges when the normalized contingency discharges are below the threshold discharge. Thus, extra utility is transferred to the reservoir by the plants that fall into the lower bulk 236 of the distribution of discharges 206. This will make up for the missing normalized compensatory charges from the plants that fall into the upper tail 238 of the distribution of discharges due to the capping of the normalized compensatory charges at the maximum 222.

The increase in the Y value of the first vertex can be calculated by an explicit solution to equation 4, or by a numerical approximation technique, such as the "goal seek" function provided in Microsoft® Excel®. The transfer function could have been alternatively balanced by allowing the threshold discharge 224 and/or the maximum charge to the reservoir 222 to vary. Practical considerations may dictate which parameters are varied. For example, if it is a user requirement that the $1^{st}$ vertex be fixed at the origin and the maximum charge to the reservoir be fixed at 1.3, then the transfer function may be balanced by adjusting the threshold discharge to a lower value with a corresponding increase in the slope of the first linear section.

System for User Adjustment of the Transfer Function

A user viewing the screen 202 may be given the option of adjusting the transfer function by allowing the user to move a vertex (e.g. the $1^{st}$ adjustable vertex 213) and programming the digital controller to keep the transfer function balanced by solving equation 4 to modify one of the parameters of another adjustable vertex (e.g. the second adjustable vertex 215). The parameter of the second adjustable vertex that the controller modifies may be the threshold discharge. This adjustability of the vertices may be implemented, for example, on a touch screen where the user touches and moves one of the adjustable vertices (e.g. item 213) and the digital controller automatically, and in real time, adjusts at least one of the parameters of another adjustable vertex (e.g. item 215) to keep the transfer function balanced. Thus, each plant can have its own custom transfer function without compromising the first practical consideration that the combined compensatory charges from all of the plants to a reservoir is set equal to or greater than the combined exposures of the plants. Allowing an entity to adjust a transfer function for each plant or a group of plants may reveal private information known by said entity about said plants. For example, if a plant operator strives to move the maximum charge 222 to as low a value as possible, that may indicate that the plant operator has private information indicating that said operator expects a very high normalized contingency discharge in the future and wants a transfer function that gives the most protection against that. In the field of insurance, this is known as adverse selection. To compensate for adverse selection, the digital controller may adjust the exposure size of the plant based on how the plant operator adjusts the transfer function. In this example, the exposure size of the plant may be increased as the user lowers the maximum charge to the reservoir.

A person of ordinary skill will understand that the transfer function and adjustability provisions do not have to be implemented as a graph. Any suitable means for receiving data from a human may be used. These may include one or more of:

a) an optical scanner;

b) a keyboard;

c) a touch screen; or d) a voice recognition system.

Any suitable means for communicating to a human may be used, such as one or more of:

a) a screen;

b) a printer; or c) a synthesized voice.

For example, a table of compensatory charges versus contingency discharges for a balanced transfer function for a given plant may be presented on a screen or printed out on paper. Input for changing the parameters may be received from a keyboard.

Any number of practical constraints may be applied to the solution of equation 4. One of said practical constraints may be that the X values of the vertices be constrained to be equal to one of the values $x_i$ of the normalized distributions of normalized discharges 206. This will simplify the computational steps to solve equation 4 since there will be no need to write code to extrapolate values of the transfer function between adjacent values of $x_i$.

It may be computationally efficient to store a balanced transfer function as a set of discrete normalized compensatory charges (i.e. $T_m(x_i,p)$), versus normalized contingency discharges $x_i$. When the normalized value of the measured quantity of contingency discharges is a value between two adjacent values of the discrete normalized contingency discharges $x_i$, then interpolation can be used to determine the quantity of compensatory charges. The interpolation may be based on the normalized value of the measured quantity of contingency discharges and the adjacent discrete normalized contingency discharges that bracket the normalized measured contingency discharge. The interpolation may be linear interpolation.

Base Functions and Trim Functions

Transfer functions with three or more linear sections may be desirable in certain situations. For example, a transfer function with a first relatively steep linear section, followed by a second more shallow linear section, followed by a third horizontally flat linear section may provide differing incentives to a plant to minimize its exposure to adverse events. The first relatively steep linear section would provide a large incentive to maintain a plant with a near perfect record of no contingency discharges. The second linear section would provide a modest incentive for the plant to have reduced contingency discharges even if the record of the plant is not perfect. The third linear section would provide reassurance to the plant that the required compensatory charges would be capped even if very large contingency discharges occurred despite the plant's best efforts. Adjusting the transfer function to keep it balanced, however, for all normalized distributions of normalized discharges can be difficult when there are three or more linear sections. There is a plurality of dependent parameters (e.g. the X and Y values of the vertices) that can be adjusted as the normalized distribution of normalized discharges changes from one exposure size class to another. Furthermore, there is ambiguity as to which parameters should be modified to keep the transfer function balanced as a user adjusts one or more of the vertices when making a customized transfer function. These difficulties can be addressed by reducing the number of dependent parameters p to one that can be used for all distributions and all user modifications.

Figure 3:
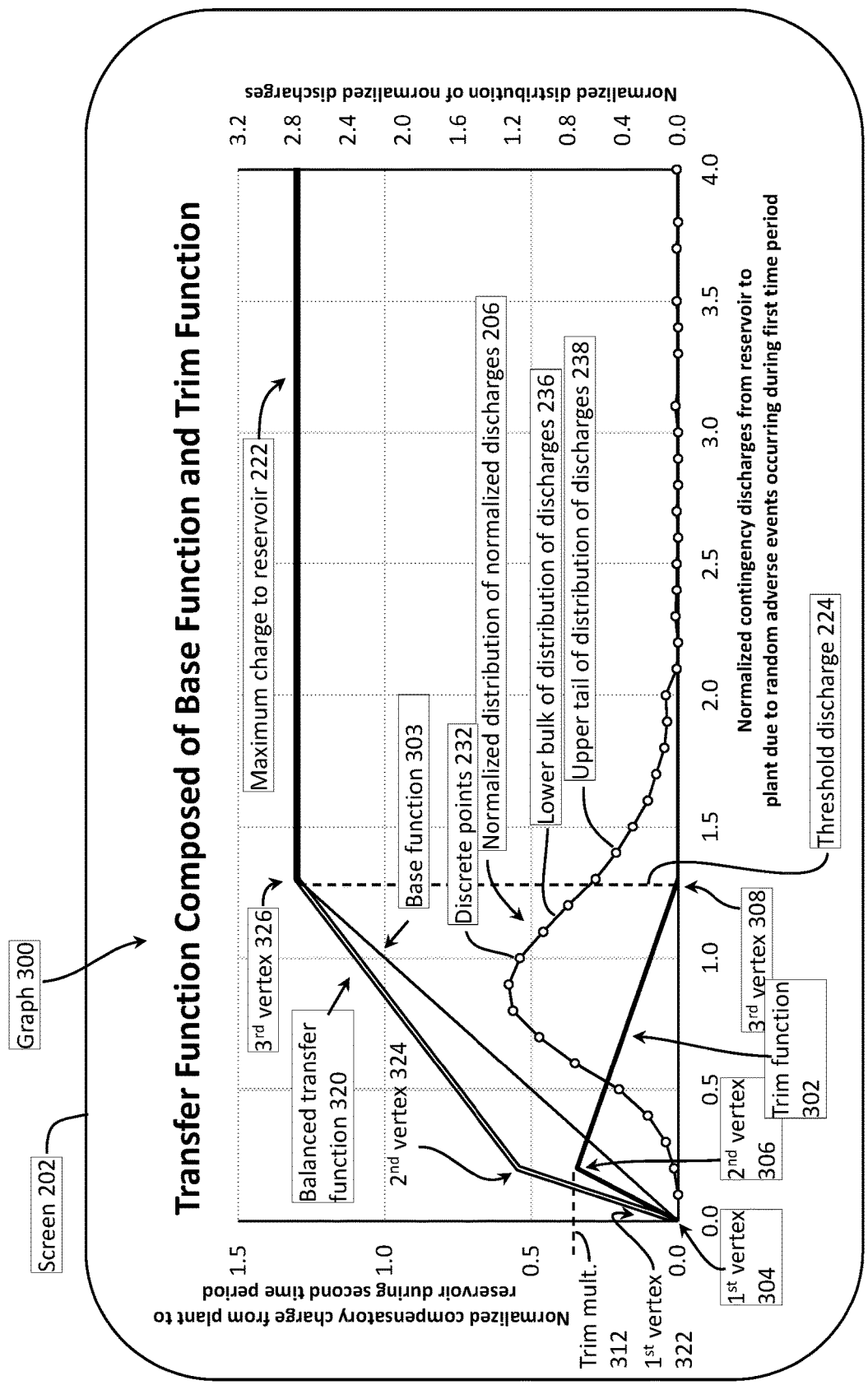
FIG. 3 is a graph of a transfer function composed of a based function and a trim function output on a screen.

FIG. 3 illustrates a method for reducing the number of dependent parameters to 1 for transfer functions with any number of linear sections. FIG. 3 shows a graph 300 presented on screen 202 of a balanced sectionally linear transfer function 320 with three linear sections. The balanced transfer function comprises a $1^{st}$ vertex 322, $2^{nd}$ vertex 324, and $3^{rd}$ vertex 326. The $1^{st}$ vertex is at the origin. The transfer function is capped at a maximum 222 at the $3^{rd}$ vertex 326 for all values of normalized contingency discharges above the threshold discharge 224.

The balanced transfer function was created by summing a base function 303 plus a scaled trim function 302. The base function in this example is piecewise linear function. The trim function is scaled by a trim multiplier 312. In this example, the base function is equal to the unbalanced transfer function 204 of FIG. 2. Any base function, however, can be used subject to the practical considerations discussed above. The idea behind a base function is that it will have the general characteristics of the desired balanced transfer function. The same base function can be used for all plants. The idea behind the trim function is that it provides a small adjustment to the base function so that the balanced transfer function is, in fact, balanced. The trim multiplier is the single parameter p that is adjusted for balancing equation 1 or 4.

In this example, the trim function has positive values between the origin and the threshold discharge. The trim function has a first vertex 304, a second vertex 306 and a third vertex 308. The first vertex of the trim function is at the origin. The second vertex is at a positive X value and Y value. The third vertex has an X value equal to the threshold discharge 224 and a Y value of zero. In this example, the trim function is piecewise linear. Any trim function can be used provided it has positive values between the origin and the threshold discharge. The values of the trim function above the threshold discharge should be about zero.

They can also be negative. If the trim function has positive values above the threshold discharge, then the threshold discharge can be redefined to be the largest X value of the trim function for which all values of the trim function at higher X values are less than or about equal to zero.

In order to balance the transfer function for a given normalized distribution of normalized discharges, the trim multiplier is adjusted using the method described with reference to equation 4 above. The process can be repeated for the normalized distributions of normalized discharges associated with different exposure size classes.

Balanced Transfer Function with Extended Slope Base Function

Figure 4:
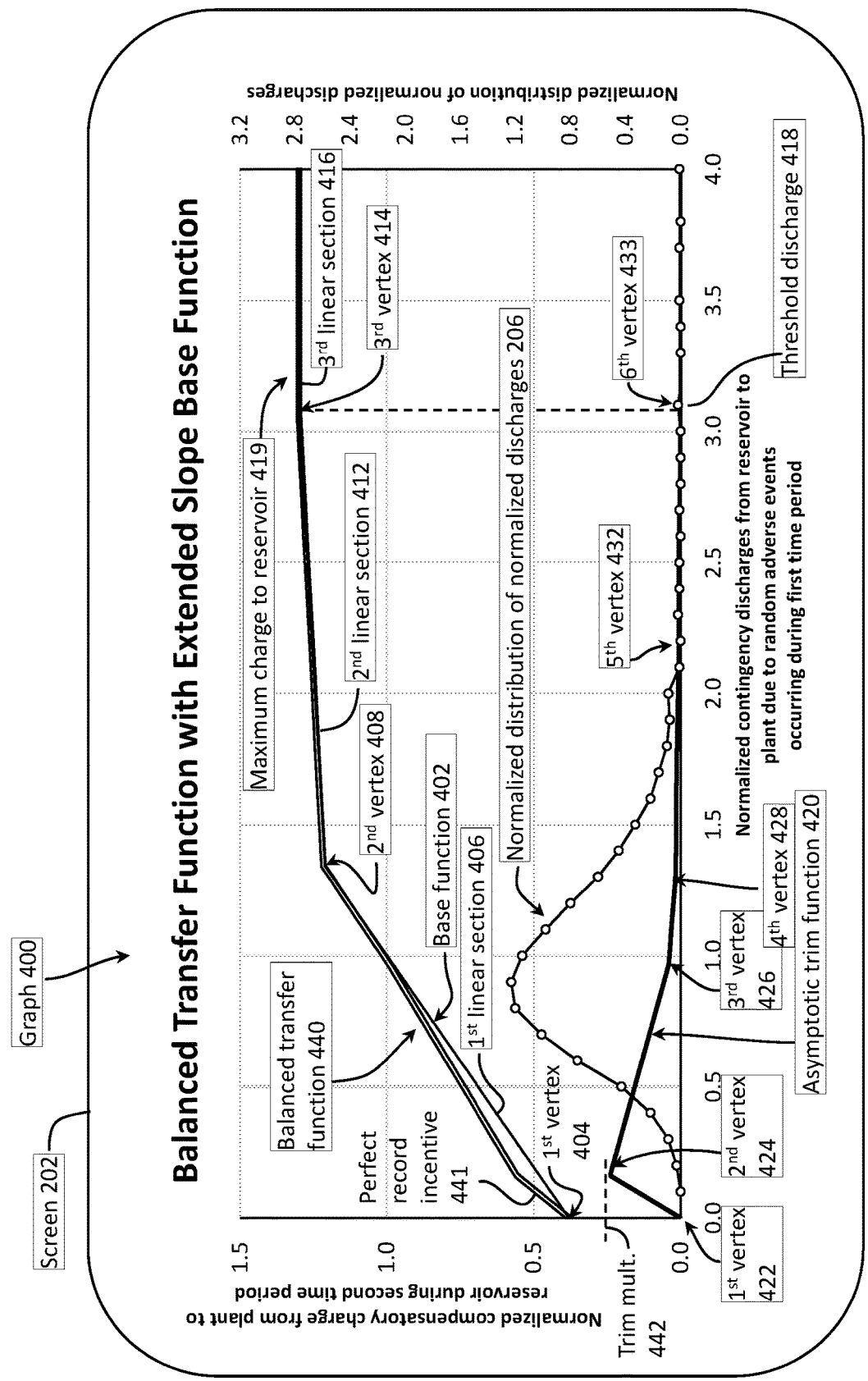
FIG. 4 is a graph of a balanced transfer function with extended slope base function output on a screen.
Figure 5A:
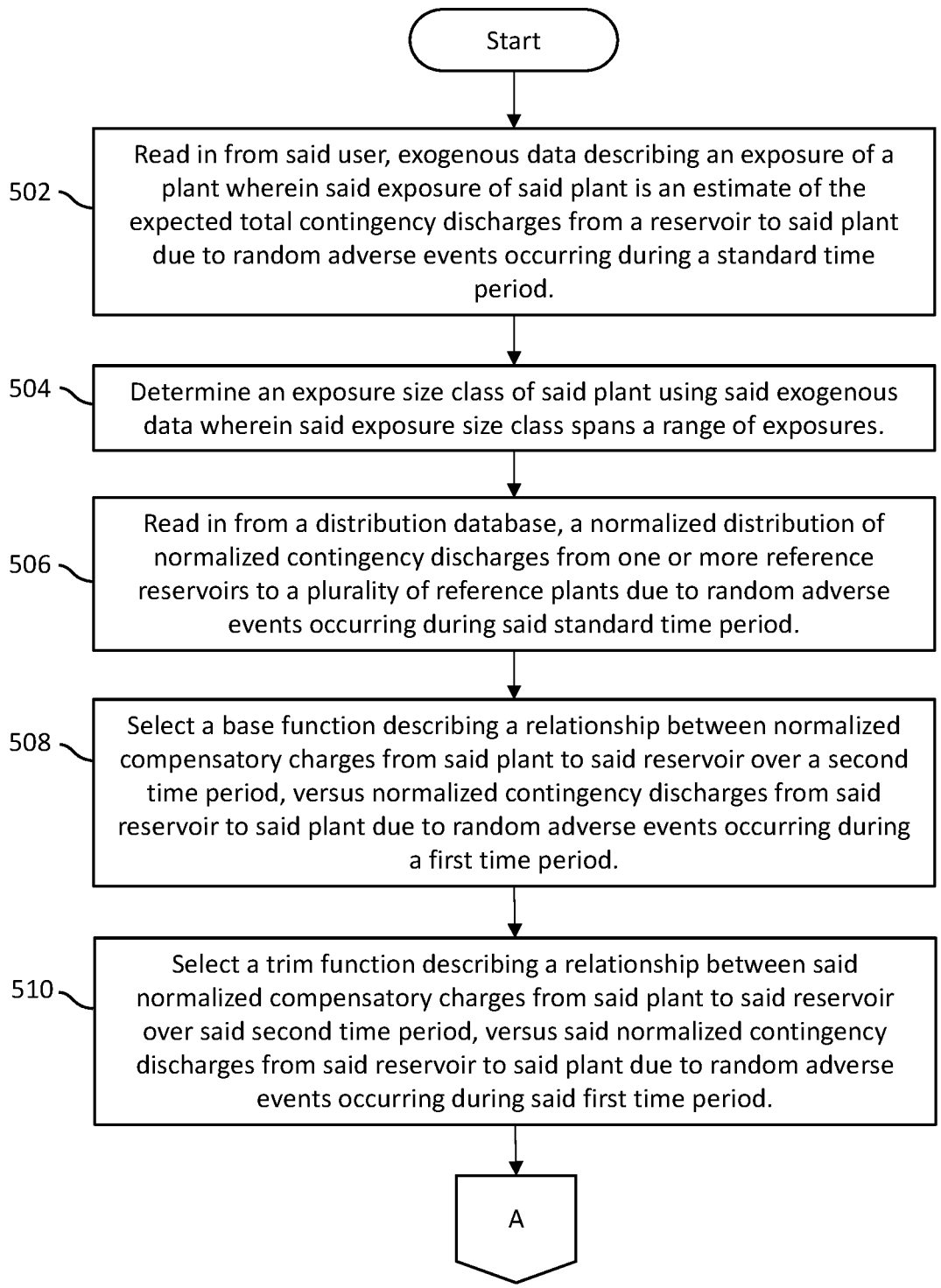
FIGS. 5A to 5C are a flow chart of the steps a controller may execute to determine a balanced transfer function, adjust said balanced transfer function, and control the compensatory charges from a plant to a reservoir during a second time period.
Figure 5B:
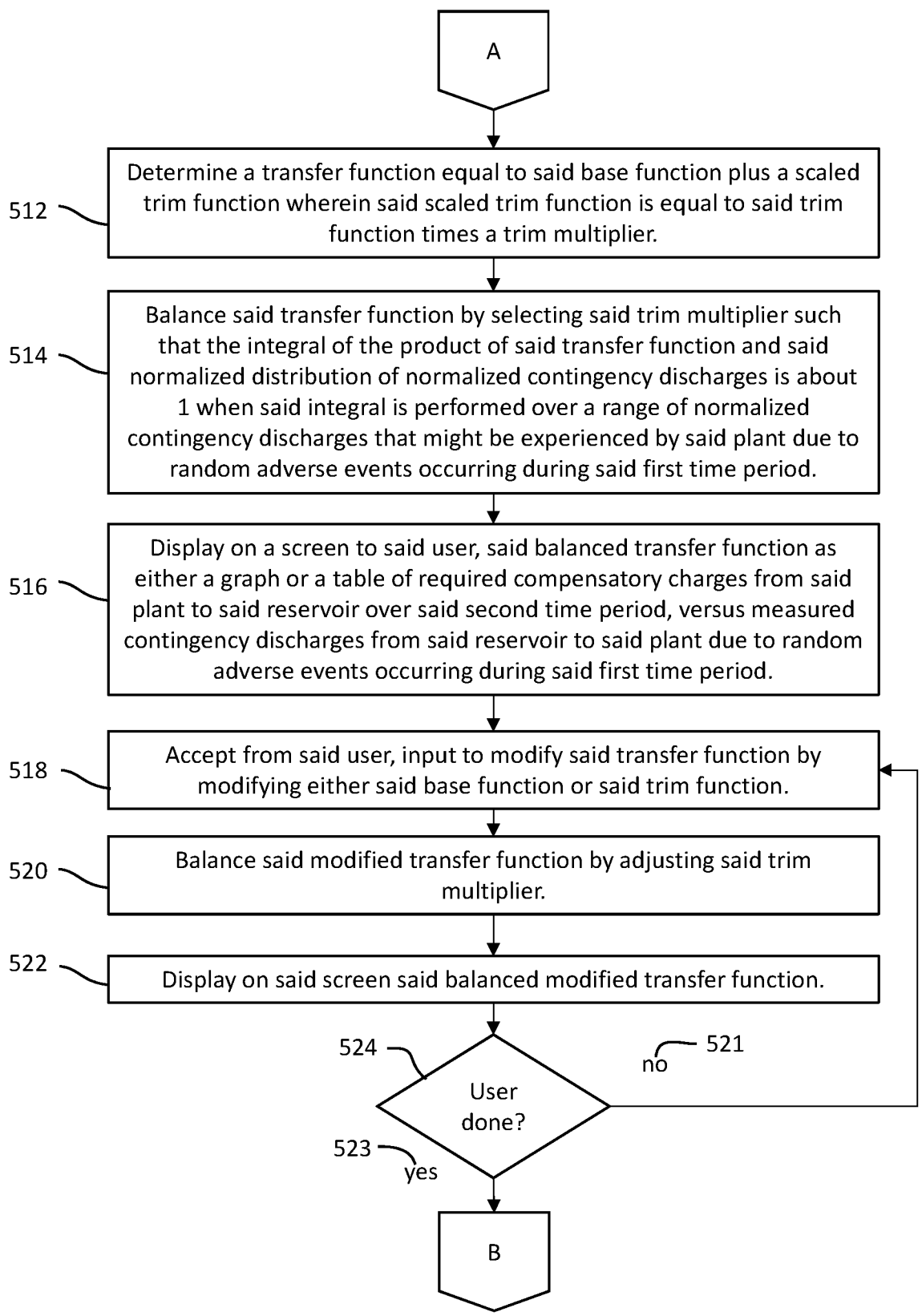
Figure 5C:
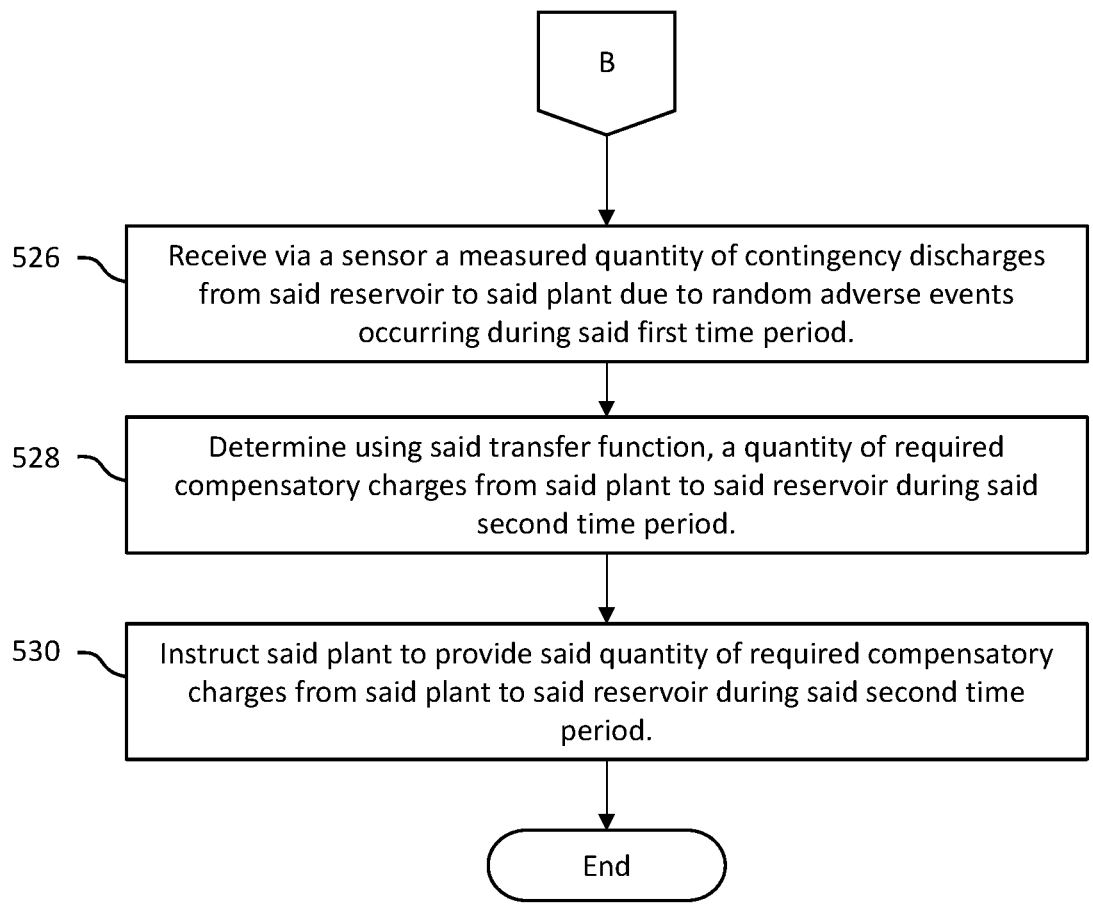

FIG. 4 shows a graph 400 displayed on the screen 202 of a balanced transfer function 440 constructed from an extended slope base function 402. A scaled asymptotic trim function 420 is added to the extended slope base function to balance it. The extended slope base function comprises:
 a) a first vertex 404 followed by a first linear section 406 with a first positive slope;
 b) a second vertex 408 followed by a second linear section 412 with a second positive slope wherein:
  i) said second vertex connects said first linear section to said second linear section; and
  ii) said second slope is less than said first slope (hence it is "extended"); and
 c) a third vertex 414 followed by a third linear section 416 with a third slope wherein:
  i) said third vertex connects said second linear section to said third linear section; and
  ii) said third slope is about zero.

The threshold discharge 418 is set to the X value of the $3^{rd}$ vertex. The maximum compensatory charge 419 is capped at the Y value of the $3^{rd}$ vertex. The Y value of the $3^{rd}$ vertex is about 1.3 in this example.

As discussed above, a utility of the base function is to illustrate to a user the general features what will ultimately be in the balanced transfer function 440. In this example, the user will observe that most of the time, a plant in the exposure size class of the normalized distribution 206 will have normalized contingency discharges in the first linear section with a relatively steep slope. Thus, there is a strong incentive to manage the plant to minimize the contingency discharges due to random adverse events occurring during a first time period since there will be reduced compensatory charges required during a second time period. The second linear section with the extended slope will provide a reduced but meaningful incentive to continue to manage a plant to reduce contingency discharges even if the contingency discharges experienced initially during a first time period are larger than what is typical. The third linear section insures that the compensatory charges required during the second time period are capped at the maximum 419 even if the normalized contingency discharges due to random adverse events occurring during the first time period are very large.

The extended slope base function also has utility in terms of improving the performance of the plant. Plants, such as power generation facilities, can be described by performance curves where the efficiency of the plant is a function of the output/load of the plant. There is commonly a maximum in the performance curve at an optimal output of the plant. If the output is below or above the optimum, the efficiency of the plant falls off. For example, with a windmill, as the load is increased from zero, the efficiency first increases, then reaches a maximum and then falls off. This is related to the aerodynamic design of the windmill's vanes. With an extended slope base function, the maximum compensatory charge (i.e. the load) is pushed out to a higher threshold discharge where the probability of the plant reaching that higher threshold is very low. Thus, the plant is more likely to operate near its optimum efficiency for generating a compensatory charge in any given time period. Similarly, by increasing the Y value of the $1^{st}$ vertex of the base function, the low end of the normalized compensatory charges is similarly moved closer to the optimum of the plant's performance curve. Different types of plants (e.g. solar arrays, gas fired generators, etc.) may have different performance curves. Thus, additional linear sections may be introduced into the base function or the trim function to give a balanced transfer function that has on average optimal performance for a given plant depending upon the normalized distribution of normalized discharges.

An asymptotic trim function is designed to increase the compensatory charges required from plants with contingency discharges below the threshold discharge 418 but without grossly changing the nature of the balanced transfer function relative to the base function. The asymptotic trim function 420 in FIG. 4 also introduces a small but significant extra steep linear section to the balanced trim function for very low normalized contingency discharges. This can be thought of as a "perfect record incentive" 441. The trim function achieves these design goals by having a first vertex 422 at the origin and a second vertex 424 near the origin with a relatively high Y value. The subsequent $3^{rd}$ vertex 426, $4^{th}$ vertex 428, $5^{th}$ vertex 432 and $6^{th}$ vertex 433 have progressively smaller Y values. This spreads out the collection of extra compensatory charges over most of the normalized distribution. The $6^{th}$ vertex is at the threshold discharge 418 and has a Y value of zero.

Different plants belonging to different size classes will have different normalized distributions of normalized discharges. The users responsible for each of the plants, however, can be presented with the same base function and trim function. Once the base functions are balanced with the scaled trim functions, the balanced transfer functions will have the same general characteristics as the common base function and trim function but with differences in details depending upon differences in the trim multipliers 442. Distributions with very long tails, for example might require larger trim multipliers to collect more compensatory charges from the plants with normalized contingency discharges below the threshold discharge. An additional constraint may be needed in the digital controller to limit how large a trim multiplier can be such that the practical considerations 1, 2 and 3 hold for the balanced trim function. For example, in the example shown in FIG. 4, if the trim multiplier is very large, then it's possible that the balanced transfer function might have a region of negative slope. This would violate practical consideration #3 that the transfer function always increases or stay the same with increasing contingency discharges.

Example 1

A wind farm comprising a plurality of windmill generators is connected by an electric grid to customers who consume electricity, and a reservoir system for storing electricity. Each windmill is a plant. Electricity is a utility. The reservoir system is a reservoir for the utility. The reservoir system comprises an upper water reservoir, a lower water reservoir, an electric pump for pumping water from the lower reservoir to the upper reservoir, and a water turbine generator for generating electricity from water flowing from the upper reservoir to the lower reservoir. A digital controller is provided to control the flow of water between the reservoirs.

The digital controller monitors the windmills to sense downtime due to one or more adverse events. An adverse event might be a bird strike that damages a blade of a windmill. Upon sensing downtime in a first windmill, the digital controller releases water from the upper reservoir to the lower reservoir. Electric power is produced by the water turbine generator and provided to the grid on behalf of the first windmill. A water release due to an adverse event occurring to a windmill is a contingency discharge. The digital controller receives a signal from an anemometer mounted on the first windmill to determine how much power would have been produced by the windmill had the windmill been operational. The size of the contingency discharge is scaled accordingly. An operator must also make a log entry into the digital controller to verify that the downtime is due to an adverse event. If the windmill stops simply due to a loss of local wind, then no contingency discharge is made by the controller.

At the end of a first time period, the controller sums up all of the contingency discharges for the first windmill. The controller then executes the balanced transfer function 440 of FIG. 4 to determine how much water should be pumped from the lower reservoir to the upper reservoir on behalf of the first windmill during a second time period. The water pumped during the second time period is a compensatory charge. The digital controller then diverts electric power from the grid to the water pump on behalf of the first windmill in accordance with the compensatory charge determined by the balanced transfer function. The chargeable electricity provided by the first windmill to customers is decremented accordingly.

The operator of the first windmill recognizes that bird strikes can be avoided if ultrasonic speakers are installed on the windmill to cause birds to avoid flying near the fan blades. The operator uses the balanced transfer function and the normalized distribution of normalized discharges for windmills in the first windmill's exposure size class to determine that the cost of the ultrasonic speakers will be paid back in a reasonable amount of time. The savings in required compensatory charges resulting from lower contingency discharges are due to fewer bird strikes to the fan blades. The ultrasonic speakers are installed and the contingency discharges are reduced.

Example 2

Maintenance workers in the wind farm are subject to on-the-job injuries due to the repair of fan blades damaged by bird strikes. The workers are covered by a retrospective workers' compensation insurance policy provided by an insurance company. During a first time period, the total cost of the workers' medical expenses and lost time are summed up to provide total workers' compensation claims. The wind farm is a plant. Benefits paid to cover workers' compensation claims are contingency discharges.

The claims are paid from money in an insurance company's reserve account. The money is a utility. The insurance company's reserve account is a reservoir of the utility. The claims are paid by an automated system after receiving input from an insurance adjuster. The automated system is a controller.

At the end of a first time period, the total claims are divided by the average claims of a plurality of other wind farms of similar size and employment to give normalized contingency discharges. The plurality of other wind farms are reference plants. The average of the claims of the other wind farms is the exposure size of the wind farm.

The automated system uses the transfer function 440 of FIG. 4 to determine the normalized compensatory charges required from the wind farm during a second time period. The normalized compensatory charges are multiplied by the exposure size of the wind farm to give the compensatory charges. The compensatory charges are a retrospective premium required from the wind farm during the second time period. The automated system bills the wind farm for the compensatory charges and the compensatory charges received from the wind farm are used to replenish the insurance company's reserve account.

Example 3

The first windmill is hit by a tornado causing a long duration downtime. The long duration downtime causes a long duration contingency discharge that begins during a first time period and extends into a second time period. At the beginning of the second time period, using prior data from reference plants, the digital controller estimates the portion of the long duration contingency discharge that will occur during the second time period. This estimate is added to the measured contingency discharge to give a total estimated contingency discharge due to a random adverse event occurring during the first time period. The controller then uses the total estimated contingency discharge to determine the compensatory charge for the second time period even though the long duration downtime is not complete.

Normalized Contingency Discharge Rank

The digital controller may control a quantity of compensatory charges of a utility from a plant to a reservoir during a second time period using a normalized contingency discharge rank (NCDR). A normalized contingency discharge rank is based on the fraction of quantities of normalized reference contingency discharges received by a set of reference plants in the same exposure size class as the plant of interest that are less than a measured quantity of contingency discharges for said plant. The reference contingency discharges are for random adverse events occurring during a standard time period. The contingency discharges for the plant are for random adverse events occurring during a first time period. The first time period may have the same duration as the standard time period. An advantage of using a transfer function based on rank is that the same transfer function can be used for nearly all exposure size classes of plants with certain exceptions as discussed in part below.

Figure 6:
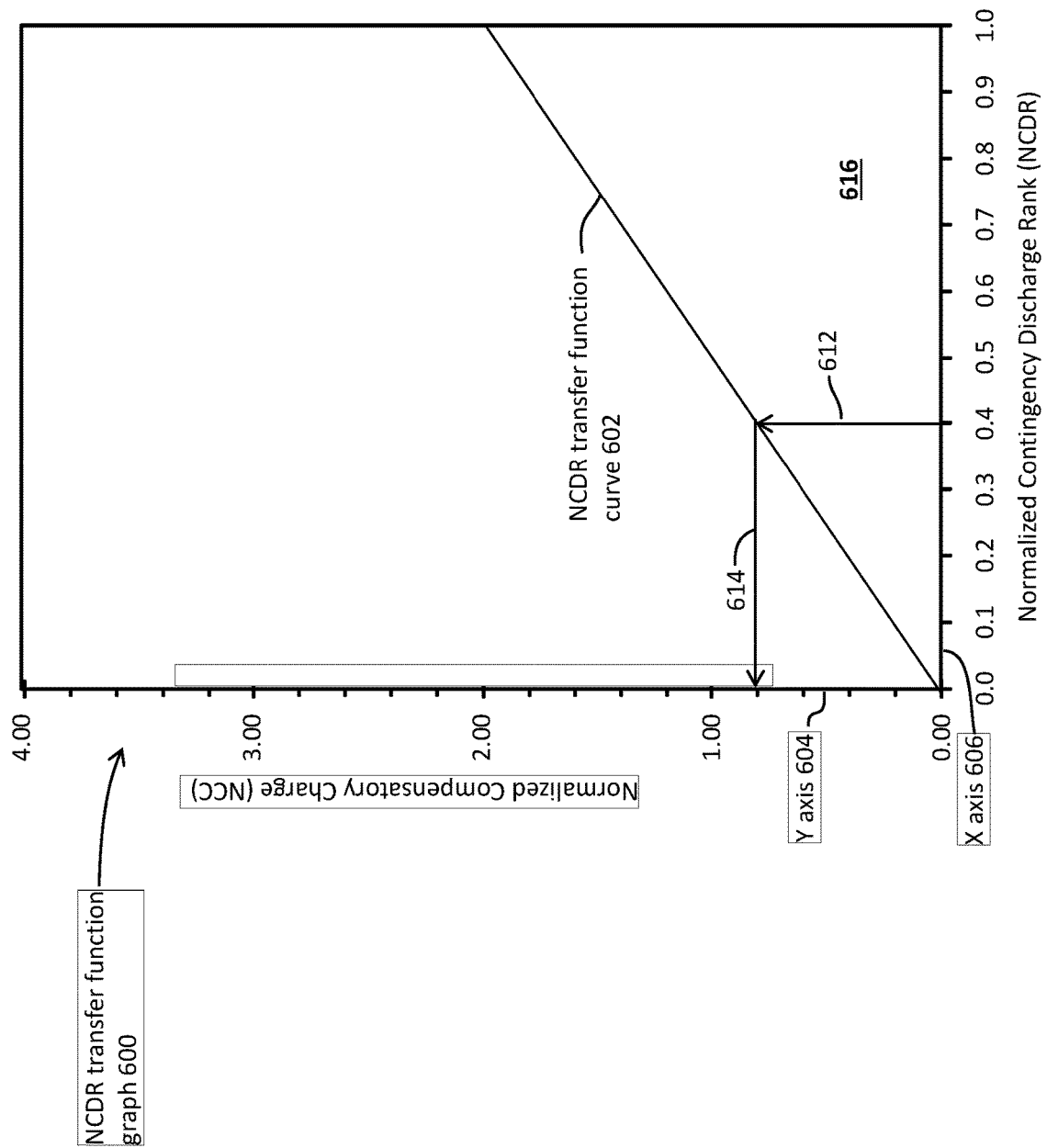
FIG. 6 is a normalized contingency discharge rank (NCDR) transfer function graph.

FIG. 6 is a graph 600 of a normalized contingency discharge rank transfer function curve 602. The X axis 606 is normalized contingency discharge rank (NCDR) expressed as a fraction from 0 to 1. The Y axis 604 is the quantity of normalized compensatory charges (NCC) that will be required of a plant during a second time period when said plant has a given NCDR for a first time period.

In order for the NCDR transfer function to be balanced, the area 616 under the curve 602 needs to be about unity. Balanced NCDR transfer functions can be designed using digital calculation means, mechanical calculation means or human reasoning depending upon the nature of the transfer function. In a digital embodiment, a user can adjust parameters of an NCDR transfer function displayed on a computer screen and the computer can automatically adjust other parameters so that the area under the curve is about unity. Alternatively, a user can use a piece of paper and a pencil to design an NCDR transfer function that has an area under the curve of about unity. The user may, for example, count the number of squares on graph paper under the curve to determine the curve's area. A user may alternatively use a mechanical device to measure area, such as a planimeter. For geometrically simple NCDR transfer curves, a user may use geometric reasoning to determine the area under the curve. For example, a user with geometric knowledge can see that the area under the curve 602 is about unity since the area of the triangle formed by said curve is equal to ½ the base (1 unit) times the height (2 units).

In order to determine a quantity of normalized compensatory charge (NCC) required of a plant over a second time period, a digital controller or a human user may carry out the steps:

measure a quantity of contingency discharges for said plant due to random adverse events occurring during a first time period;

normalize said quantity of contingency discharges using the exposure size of the plant;

determine what fraction of reference plants in the exposure size class of said plant have a quantity of normalized contingency discharges due to random adverse events occurring during a standard time period that are less than or equal to said quantity of normalized contingency discharges for said plant that occurred due to random contingency events during said first time period;

evaluate said NCDR transfer function for said NCDR of said plant; and set said value of said NCC equal to said evaluated value of said NCDR transfer function.

In the example shown in FIG. 6, a plant of interest has a measured value 612 of normalized contingency discharge rank of about 0.4. This corresponds to a value 614 of normalized compensatory charge of about 0.8.

An output device may be provided on a digital controller to automatically control the compensatory charges required of the plant during the second time period. Alternatively, a user may adjust a valve to control the compensatory charge from the plant to the reservoir based on the NCC output by the controller.

Rank and Cumulative Distribution Function

Figure 7:
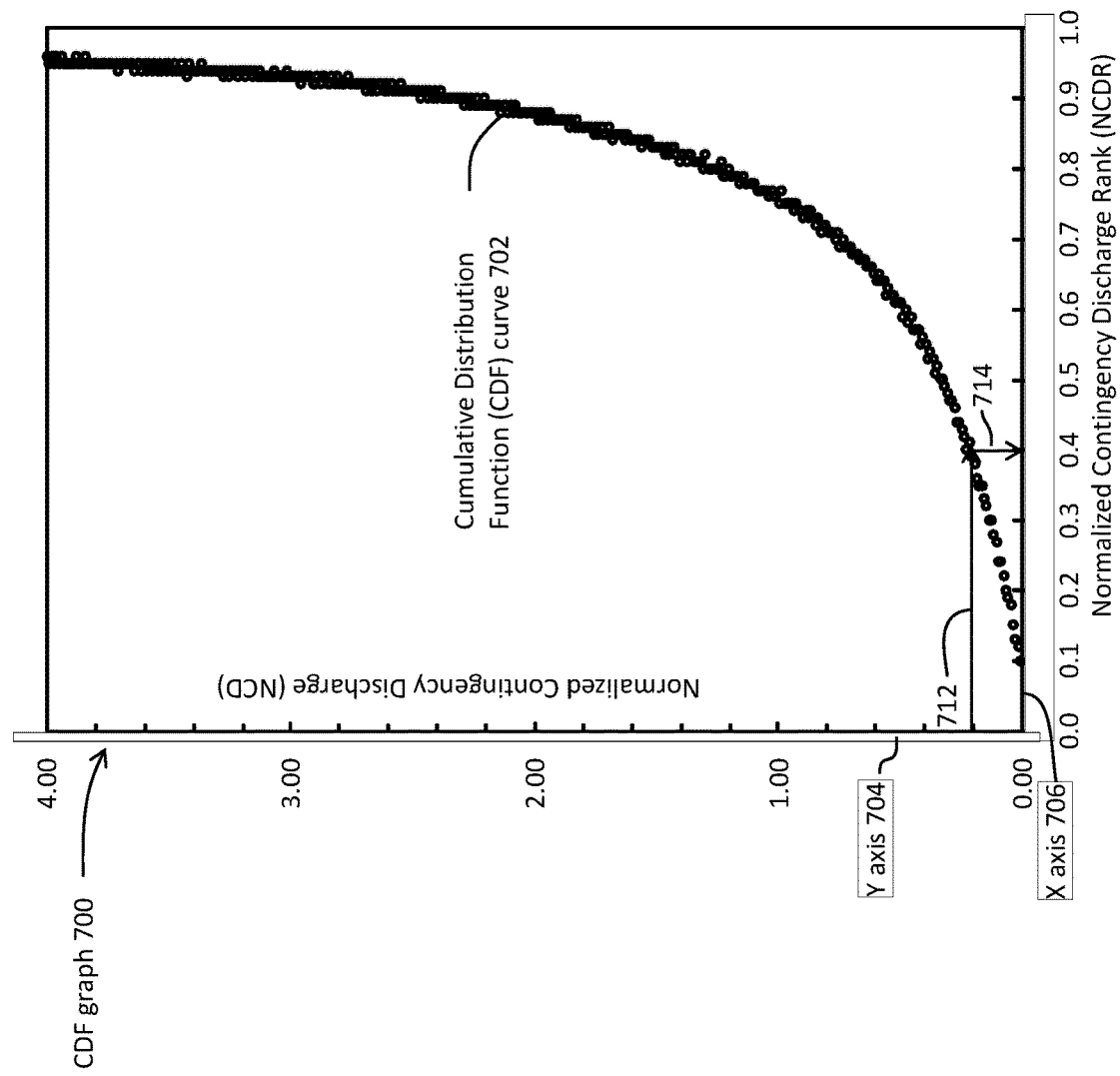
FIG. 7 is a cumulative distribution function (CDF) graph.

An effective way to determine rank is to use a cumulative distribution function (CDF) for the reference plants. A cumulative distribution function can be thought of as rank that is normalized to have a value between 0 and 1. FIG. 7 shows a graph 700 of a cumulative distribution function (CDF) curve 702. The X axis 706 is the normalized contingency discharge rank (NCDR). The Y axis 704 is the corresponding normalized contingency discharge (NCD). In order to determine a NCDR, a user or digital controller determines a value of the CDF curve for a value (e.g. item 712) of normalized contingency discharge. The rank (e.g. item 714) is the X value of said CDF curve at said value off the Normalized Contingency Discharge.

In the field of Workers' Compensation Insurance, the Table M referenced above can be used to determine a cumulative distribution function. A suitable equation for calculating said CDF is:

$$CDF_i = \frac{(MNC_{i+1} - MNC_i)}{\Delta x} \quad (5)$$

where:
x is a normalized contingency discharge;
i is an index number;
$x_i$ is the $i^{th}$ value of x;
$\Delta x$ is the spacing between adjacent $x_i$;
$MNC_i$ is the value of missing normalized charge (MNC) associated with $x_i$; and
$CDF_i$ is the $i^{th}$ value of the cumulative distribution function of normalized contingency discharges.

The cumulative distribution function 702 in FIG. 700 was calculated from Table M data for a particular exposure size class of a plant where the workers are covered by a workers' compensation insurance policy. We will refer to the exposure size class as "Medium".

Transfer Function Nomogram

An NCDR transfer function curve can be combined with a CDF curve for given exposure size class of plant to provide a transfer function nomogram appropriate for said exposure size class. The transfer function nomogram can be used to determine a balanced transfer function relating normalized contingency discharge to normalized compensatory charge for plants in said exposure size class.

Figure 8:
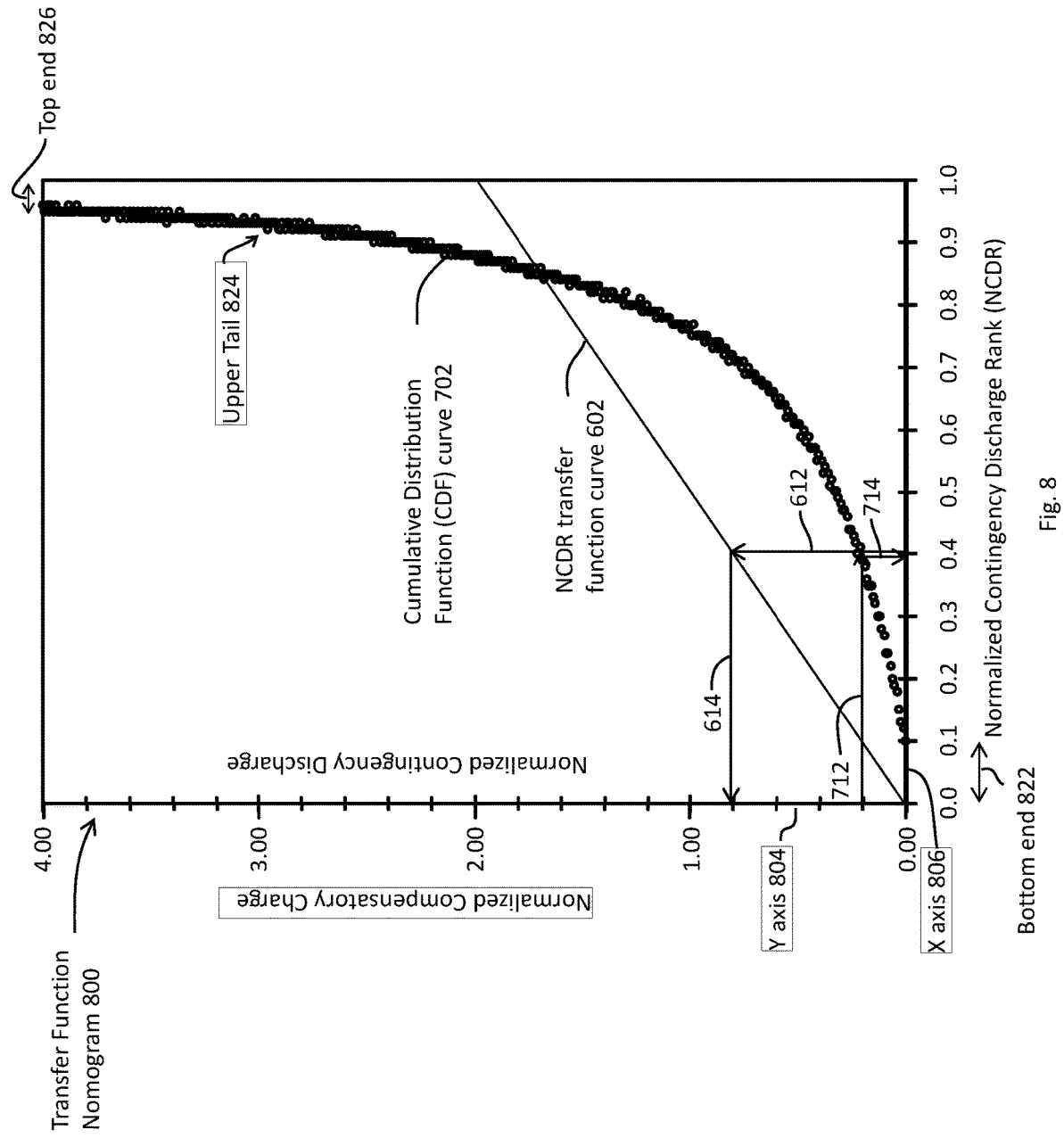
FIG. 8 is a transfer function nomogram.

FIG. 8 is a transfer function nomogram 800. The nomogram comprises:
  a) a graduated X axis 806 denominated in normalized contingency discharge rank (NCDR);
  b) a graduated Y axis 804 denominated in normalized compensatory charge and normalized contingency discharge, both on the same scale;
  c) an NCDR transfer function curve 602; and
  d) a cumulative distribution function (CDF) curve 702.

A human user or digital controller may use the nomogram to calculate a transfer function of normalized compensatory charge vs normalized contingency discharge by carrying out the steps:
  a) select on the Y axis a normalized contingency discharge (e.g. item 712);
  b) read the corresponding normalized contingency discharge rank (e.g. item 714) based on the CDF function value for said normalized contingency discharge;
  c) read (e.g. item 612) the corresponding normalized compensatory charge (e.g. item 614) on the Y axis; and
  d) repeat steps a to c for additional values of normalized contingency discharge.

A person of ordinary skill will understand that the nomogram can have other formats and still retain its functionality. The other formats include, but are not limited to:
  a) the normalized compensatory charge and normalized contingency discharge can be graduated on different Y axes;
  b) the X and Y axis can be exchanged for each other;
  c) the CDF curve and NCDR transfer function curve can be offset from each other in the Y direction;
  d) grids can be provided; and
  e) multiple CDF curves for different exposure size classes can be provided.

The nomogram can be executed on a piece of paper for use by a person. The nomogram can also be embodied as one or more tables of values of the NCDR transfer function curve and the CDF curve. The tables of values may be in computer readable form for use directly by the digital controller.

Indeterminant Regions

There are several regions of the CDF curve in FIG. 8 where the nomogram is indeterminate for calculating normalized compensatory charge given the particular NCDR transfer function that is illustrated. These regions include:
  a) the bottom end 822 where the NCD values of the CDF curve are zero;
  b) the upper tail 824 where the NCD values of the CDF curve are multivalued; and
  c) the top end 826 of the CDF curve where the CDF curve has been cut off.

The indeterminacy in the bottom end 822 and top end 826 can be eliminated by selecting an appropriate NCDR transfer function curve. In particular, if the NCDR transfer function curve is flat over the bottom end and top end, then the value of the normalized compensatory charge will be constant in each of these regions despite the indeterminancy of the CDF curve.

The indeterminancy due to multiple values of the CDF curve for a given normalized contingency discharge in the upper tail can be eliminated by smoothing the CDF curve.

Figure 9:
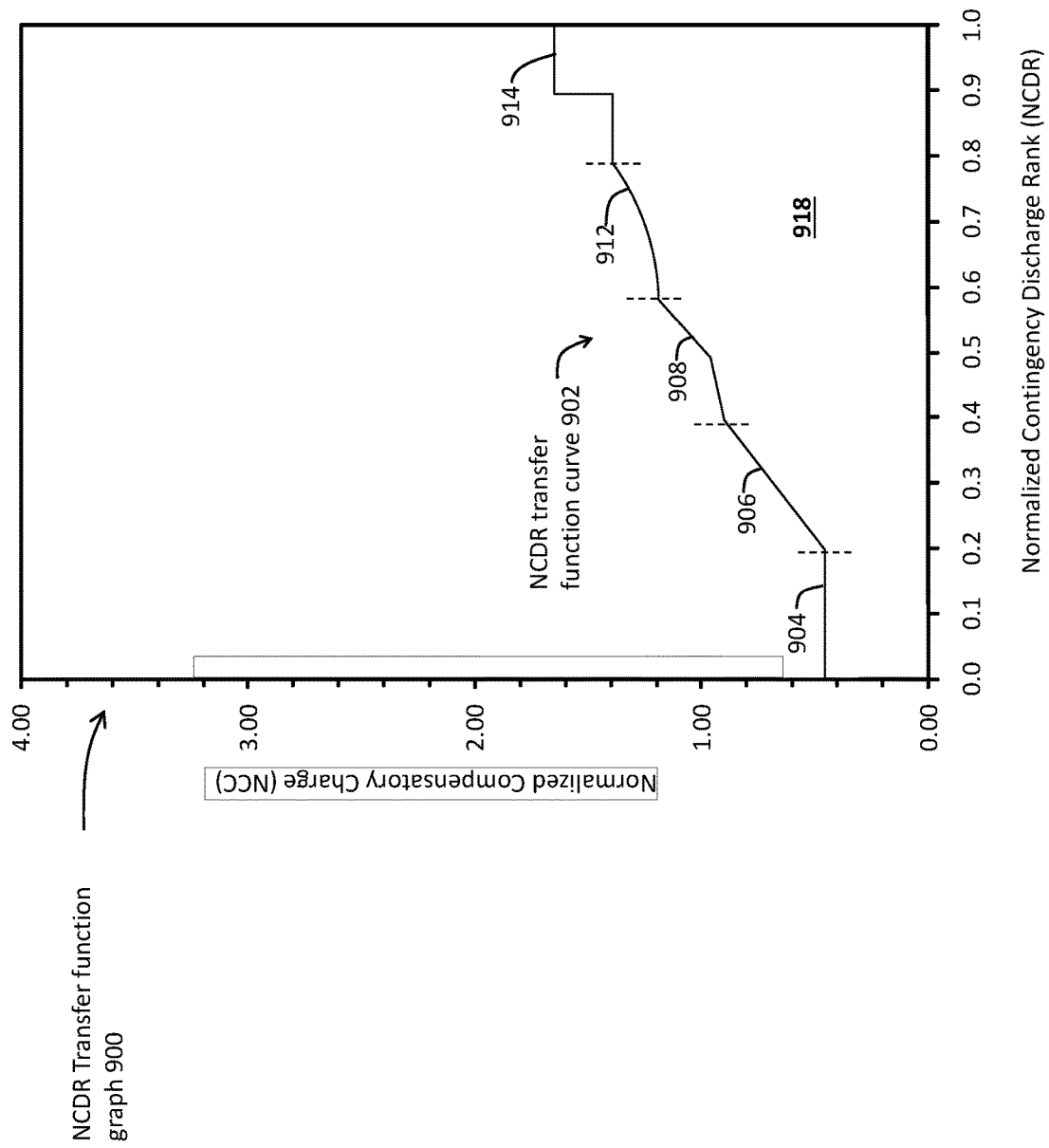
FIG. 9 is a NCDR transfer function graph.

FIG. 9 is an NCDR transfer function graph 900 showing an exemplary NCDR transfer function curve 902 that is flat at the bottom end 904 and the top end 914. The transfer function is also divided into regions with particular graphical elements. These elements are:
  a) flat 904;
  b) linear with positive slope 906;
  c) dimple 908;
  d) curved 912; and
  e) step 914.

The elements are separated with vertical dotted lines for clarity of definition.

The elements can be combined in any order or any scale provided the transfer function meets the above described criteria of:
  1) the combined compensatory charges from all of the plants to the reservoir is set equal to or greater than the combined exposures of the plants;
  2) the compensatory discharges required from each plant are capped; and
  3) the transfer function always increases or stays the same.

The NCDR transfer function meets these criteria in that:
  1) the area 918 under the NCDR transfer function curve is 1;
  2) the NCDR transfer function has a maximum 914; and
  3) the NCDR transfer function only increases or stays the same.

Figure 10:
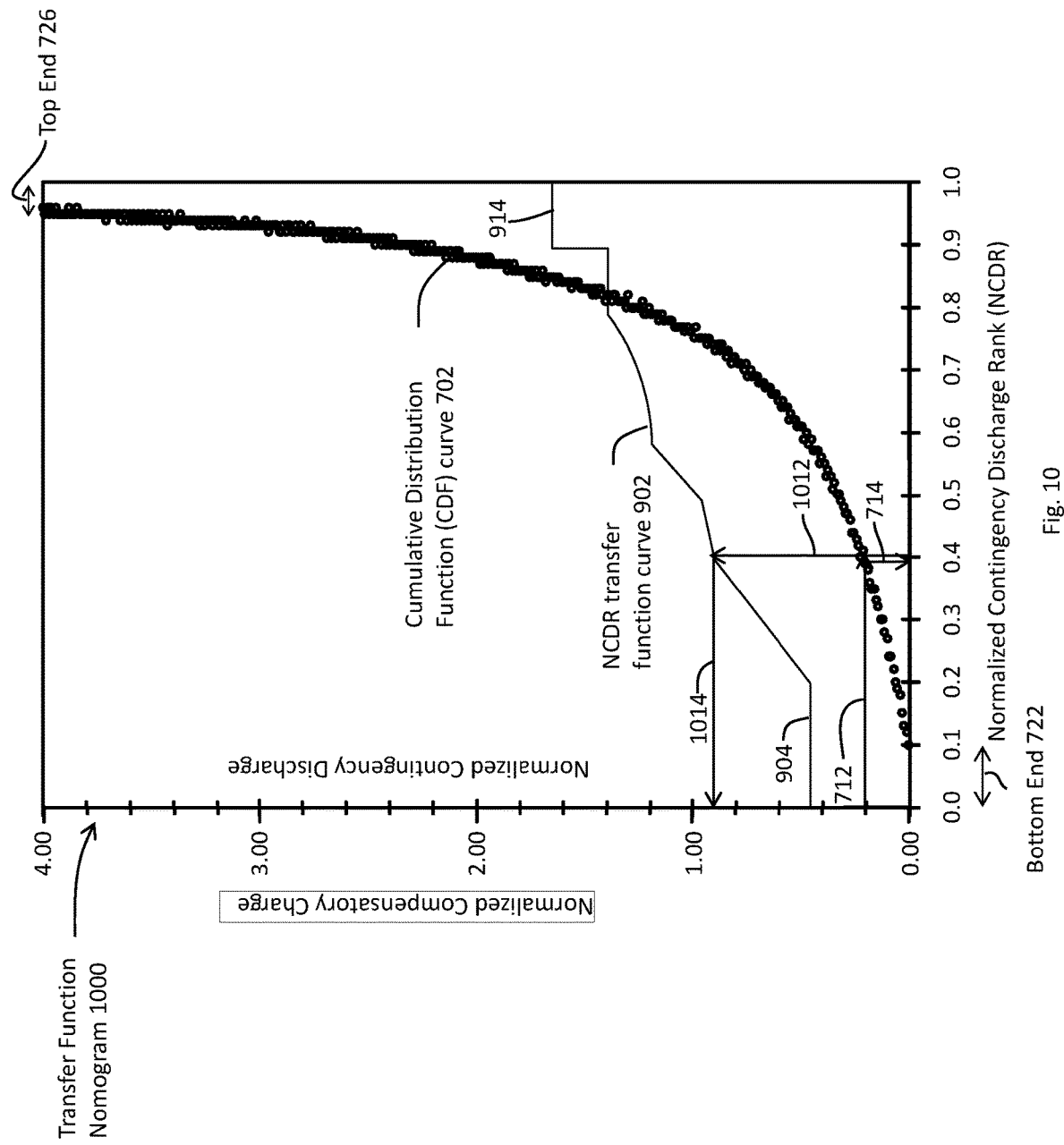
FIG. 10 is a transfer function nomogram for a medium exposure size plant.

FIG. 10 is a transfer function nomogram 1000 that comprises the NCDR transfer function 902 and the CDF curve 702 for a medium exposure size plant. A Normalized Compensatory Discharge 712 of 0.2 corresponds to an NCDR 714 of about 0.4. The NCDR corresponds 1012 to a normalized compensatory charge 1014 of about 0.9. The bottom end 722 and top end 726 have constant Normalized Compensatory charges due to the flat portions of the NCDR transfer function curve 904 and 914 that span said regions.

Figure 11:
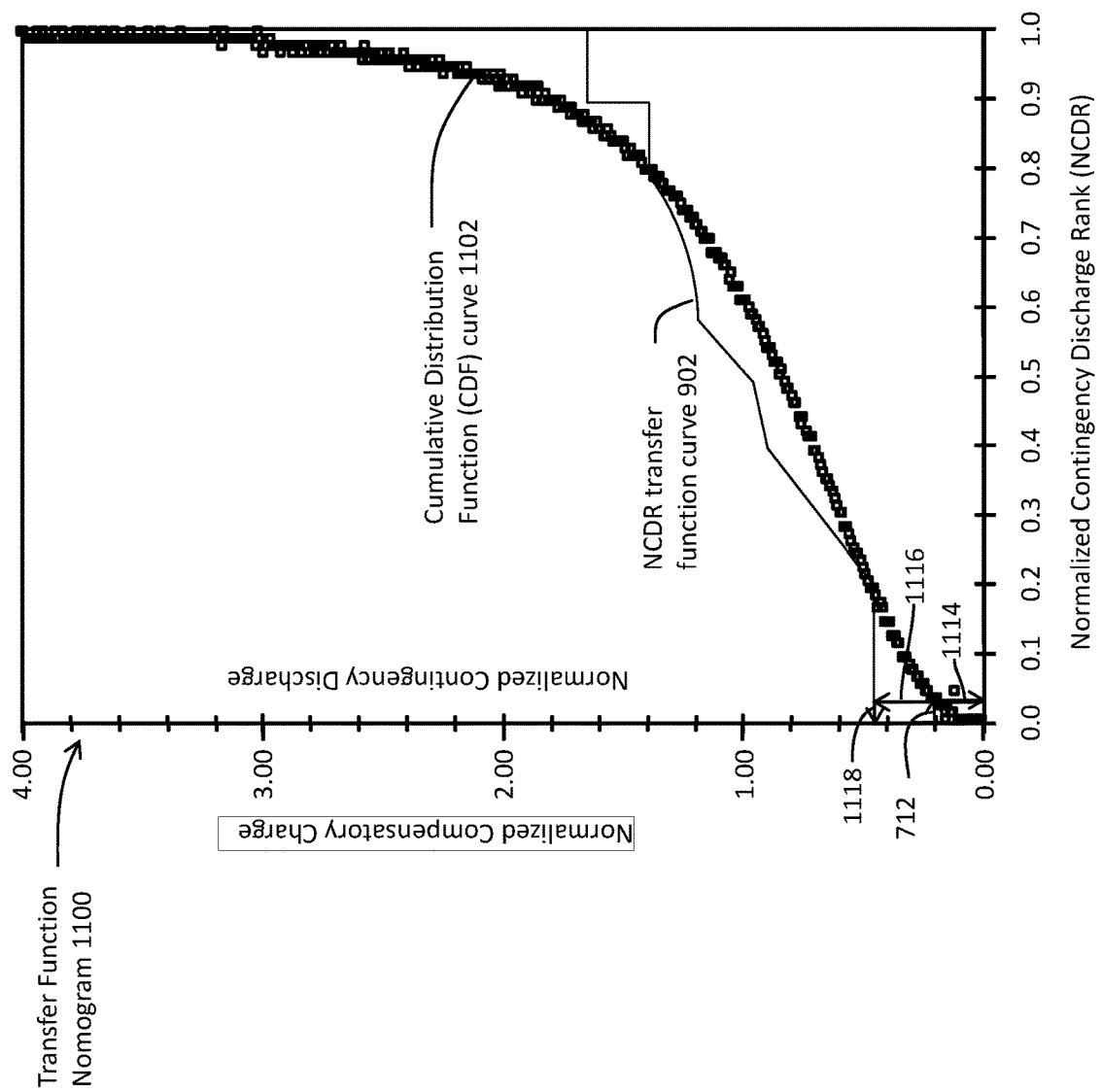
FIG. 11 is a transfer function nomogram for a large exposure size plant.

FIG. 11 is a transfer function nomogram 1100 that comprises the NCDR transfer function curve 902 and a CDF curve 1102 for a large exposure size plant. A user or digital controller can select a normalized contingency discharge value 712, determine the corresponding normalized contingency discharge rank 1114 from the CDF curve 1102, and then determine 1116 the normalized compensatory charge 1118 from the NCDR transfer function curve 902. Thus, the same NCDR transfer function curve can be used for plants across a wide range (e.g. more than 3×) of exposure size classes.

Example 4

Example 4 is based on Example 1 of the priority document "Reinsurance Participation Plan" U.S. Ser. No. 12/696,256 filed Jan. 29, 2010. Said application is incorporated herein by reference with specific reference to said Example 1. Example 1 of the priority document expressed the reservoir controller as a workers' compensation system. Table 1 is a correspondence between the terminology used herein and the terminology in the priority document Ser. No. 12/696,256.

TABLE 1

| Terminology used herein | Terminology used in priority document Ser. No. 12/696,356 |
| --- | --- |
| Normalized contingency discharge | Loss ratio |
| Normalized compensatory charge | Premium ratio |
| Exposure Size Class | Expected Ultimate Loss Group (EULG) |
| Cumulative distribution function | Cumulative distribution function |
| Normalized contingency discharge rank | CDF |
| NCDR transfer function curve | Premium ratio curve |
| Plant | Prospective insured or company |
| Reservoir | Insurance Company |
| Contingency discharge | Actual loss |
| Compensatory charge | Retrospective premium |

Figure 12B:
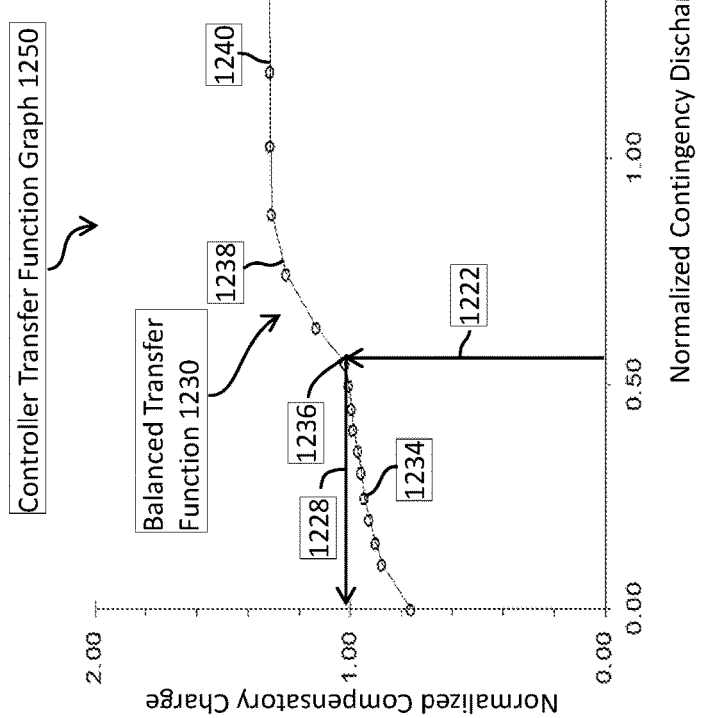
FIG. 12B is a controller transfer function graph corresponding to the transfer function nomogram of FIG. 12A.
Figure 12A:
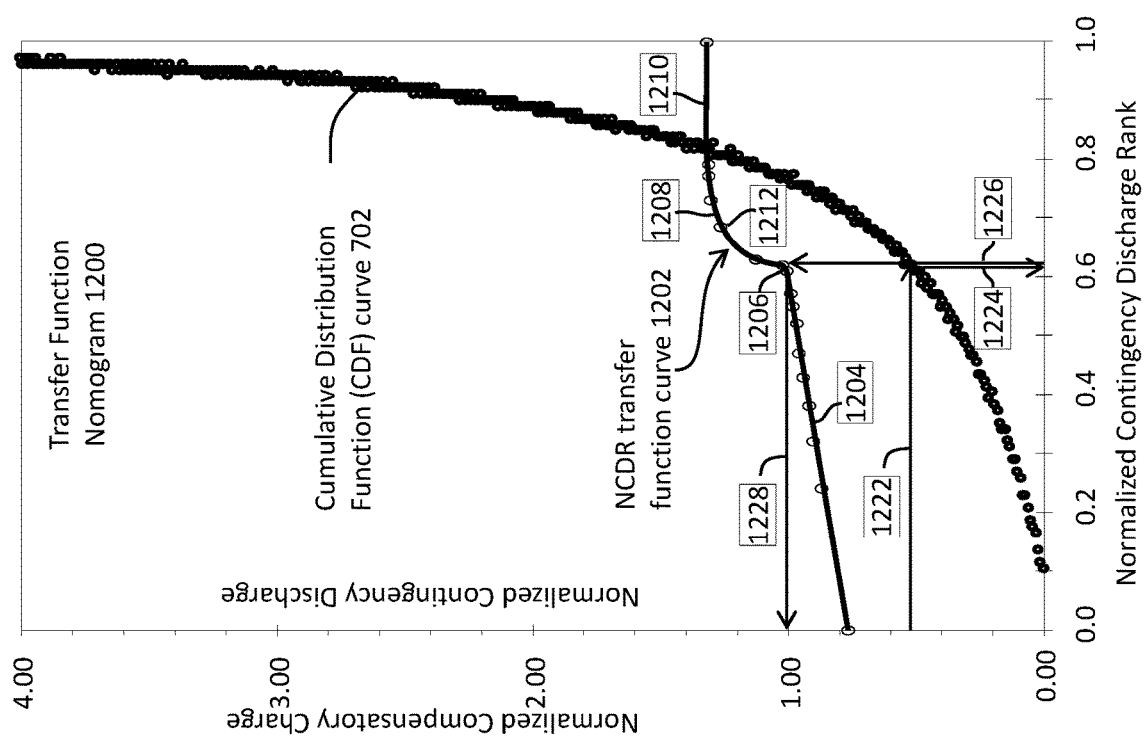
FIG. 12A is a transfer function nomogram.

In the instant example 4, a wind farm with an exposure size class of "medium" is connected by an electrical utility grid to an energy storage reservoir controlled by a digital controller. Referring to FIGS. 12A and 12B, the digital controller comprises a transfer function nomogram 1200 comprising a cumulative distribution function Curve 702 and a NCDR transfer function curve 1202. The NCDR transfer function curve 1202 of said nomogram comprises a first linear section 1204, a dimple 1206, a second curved section 1208 and a third flat section 1210. The curves of the nomogram are embodied as sets of discrete data 1212 in the permanent memory of the digital controller. The controller determines a balanced transfer function 1230 (FIG. 12B) by the steps:
 a) select 1222 a normalized compensatory charge;
 b) determine 1224 a corresponding normalized contingency discharge rank from the digitized value of the CDF curve 702;
 c) determine 1226 the normalized compensatory charge 1228 from the corresponding value of the NCDR transfer function curve 1202; and
 d) repeat steps a to c for a set of normalized contingency discharges.

Once the balanced transfer function is determined, then a normalized compensatory charge 1228 can be more efficiently determined computationally from a normalized contingency discharge 1222 for a given first time period. The characteristics of the balanced transfer function are generally similar to the NCDR transfer function. There is a first increasing section 1234, a dimple 1236, a second curved section 1238 and a third flat section 1240. Thus, plants in different exposure size classes will have balanced transfer functions with generally similar properties. This will help insure that the impacts of the transfer functions on the behavior of managing and operating personnel of the plants will be similar for different exposure size classes of plants.

The balanced transfer function 1230 may be displayed on a screen as a graph 1250 to assist a user in visualizing it.

Alternative Normalized Contingency Discharge Rank Transfer Functions

FIGS. 12A through 14B of the priority document Ser. No. 12/696,256 illustrate alternative premium ratio curves. Said figures are specifically incorporated herein by reference. Premium ratio curves as described in said priority document meet the same criteria as NCDR transfer function curves as used herein. Thus, said premium ratio curves are examples of NCDR transfer function curves.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

We claim:

1. A digital controller for controlling a quantity of compensatory charges of a utility from a plant to a reservoir during a second time period wherein:
 a) said quantity of compensatory charges are in response to a quantity of contingency discharges of said utility from said reservoir to said plant due to random adverse events occurring during a first time period that either increase a demand of said utility from said plant, reduce a capacity of said plant to produce said utility, or combinations of both; and
 b) said digital controller comprises:
  i) an input device;
  ii) an output device;
  iii) a processor for processing data; and
  iv) a permanent memory comprising computer readable instructions to cause said processor to physically carry out the steps:
   (1) determine an exposure of said plant wherein said exposure of said plant is an estimate of an expected quantity of contingency discharges from said reservoir to said plant due to random adverse events occurring during said first time period;
   (2) determine an exposure size class of said plant based on said exposure of said plant wherein said exposure size class of said plant spans a range of exposures;
   (3) receive via said input device a measured quantity of contingency discharges from said reservoir to said plant due to random adverse events occurring during said first time period;

(4) determine a normalized measured quantity of contingency discharges by dividing said measured quantity of contingency discharges by said exposure;

(5) determine a normalized contingency discharge rank (NCDR) from said normalized measured quantity of contingency discharges wherein said rank is based on a fraction of quantities of normalized reference contingency discharges that are less than said normalized measured quantity of contingency discharges, and wherein said reference contingency discharges are received by a plurality of reference plants that are in said exposure size class of said plant;

(6) determine using said normalized contingency discharge rank and a balanced NCDR transfer function, said quantity of compensatory charges required from said plant to said reservoir during said second time period; and (7) instruct said plant via said output device, to provide said quantity of compensatory charges to said reservoir during said second time period.

2. The digital controller of claim 1 wherein:
a) said balanced NCDR transfer function is described by a NCDR transfer function curve; and
b) an area under said NCDR transfer function curve is about 1.

3. The digital controller of claim 1 wherein:
a) said plant comprises one or more of:
   i) an electrical plant;
   ii) a water plant; or
   iii) a plant comprising employees;
b) said utility comprises one or more of:
   i) electrical energy;
   ii) water; or
   iii) monetary funds;
c) said reservoir is one or more of:
   i) an energy storage device;
   ii) a water storage device; or
   iii) a monetary reserve;
d) said random adverse events comprise one or more of:
   i) a loss of electric power capacity due to wind damage to said plant;
   ii) an increase in water demand from said plant due to drought; or
   iii) a loss of labor due to an on-the-job injury of one of said employees in said plant that results in one or more of medical costs or lost time costs of said injured employee; and e) said compensatory discharges from said reservoir to said plant comprise one or more of:
   i) sufficient electric power to make up for said lost electric power capacity;
   ii) sufficient water to make up for said increase in water demand; or
   iii) sufficient monetary funds to make up for said one or more of medical costs and lost time costs of said injured employee.

4. The digital controller of claim 1 wherein said input device comprises a device for receiving data from a human.

5. The digital controller of claim 4 wherein said device for receiving data from a human comprises one or more of:
a) an optical scanner;
b) a keyboard;
c) a touch screen; or
d) a voice recognition system.

6. The digital controller of claim 1 wherein said output device comprises a device for communicating to a human.

7. The digital controller of claim 1 wherein said measured quantity of contingency discharges from said reservoir to said plant due to random adverse events occurring during said first time period includes long duration contingency discharges that begin during said first time period and continue past the end of said first time period.

8. The digital controller of claim 7 wherein:
a) said second time period begins before the end of at least one of said long duration contingency discharges such that a portion of said at least one of said long duration contingency discharges occurs during said second time period; and
b) said measured quantity of contingency discharges includes an estimate of said portion of said long duration contingency discharges that will occur during said second time period.

9. The digital controller of claim 7 wherein said measured quantity of contingency discharges due to random adverse events occurring during said first time period does not include any portion of any long duration contingency discharge that begins prior to said first time period.

10. The digital controller of claim 1 wherein said compensatory charges make up for leakage in said reservoir.

11. The digital controller of claim 1 wherein said balanced NCDR transfer function comprises a dimple.

12. The digital controller of claim 1 wherein said steps include the step of:
a) determine said fraction at least in part using a Table M comprising a plurality of normalized contingency discharges versus missing normalized charges.

* * * * *